United States Patent
Nakashima et al.

(10) Patent No.: US 7,424,578 B2
(45) Date of Patent: Sep. 9, 2008

(54) COMPUTER SYSTEM, COMPILER APPARATUS, AND OPERATING SYSTEM

(75) Inventors: Kiyoshi Nakashima, Takatsuki (JP); Taketo Heishi, Osaka (JP); Shohei Michimoto, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 450 days.

(21) Appl. No.: 10/885,708

(22) Filed: Jul. 8, 2004

(65) Prior Publication Data

US 2005/0071572 A1 Mar. 31, 2005

(30) Foreign Application Priority Data

Aug. 29, 2003 (JP) ............................... 2003-306437

(51) Int. Cl.
*G06F 9/38* (2006.01)
(52) U.S. Cl. ................. 711/137; 711/118; 711/167; 711/168; 711/213; 712/237; 712/239
(58) Field of Classification Search ............... 711/118, 711/137, 213, 167; 712/237, 239
See application file for complete search history.

(56) References Cited

U.S. PATENT DOCUMENTS 5,473,764 A 12/1995 Chi
5,822,759 A * 10/1998 Treynor ...................... 711/134

FOREIGN PATENT DOCUMENTS

| JP | 11-212802 | 8/1999 |
| JP | 11-306028 | 11/1999 |

* cited by examiner

*Primary Examiner*—Sanjiv Shah
*Assistant Examiner*—Jae U Yu
(74) *Attorney, Agent, or Firm*—Wenderoth, Lind & Ponack, L.L.P.

(57) ABSTRACT

A compiler apparatus for a computer system capable of improving the hit rate of a cache memory, which includes a prefetch target extraction device, a thread activation process insertion device, and a thread process creation device. The compiler apparatus creates threads for performing prefetch and prepurge. Prefetch and prepurge threads created by this compiler apparatus perform prefetch and prepurge in parallel with the operation of the main program, by taking into consideration program priorities and the usage ratio of the cache memory.

8 Claims, 22 Drawing Sheets

FIG. 9

```
extern int s, t, x, y;

int func1()
{
        int a=0;
        int b=0;

a = x + y;
        b = x * y;
        x++;
        y++;
        if (a > b){
                a = b+s;
        }else{
                a = b+t;
        }
        func2();
        a = b + x*y;
        return a;
}
```

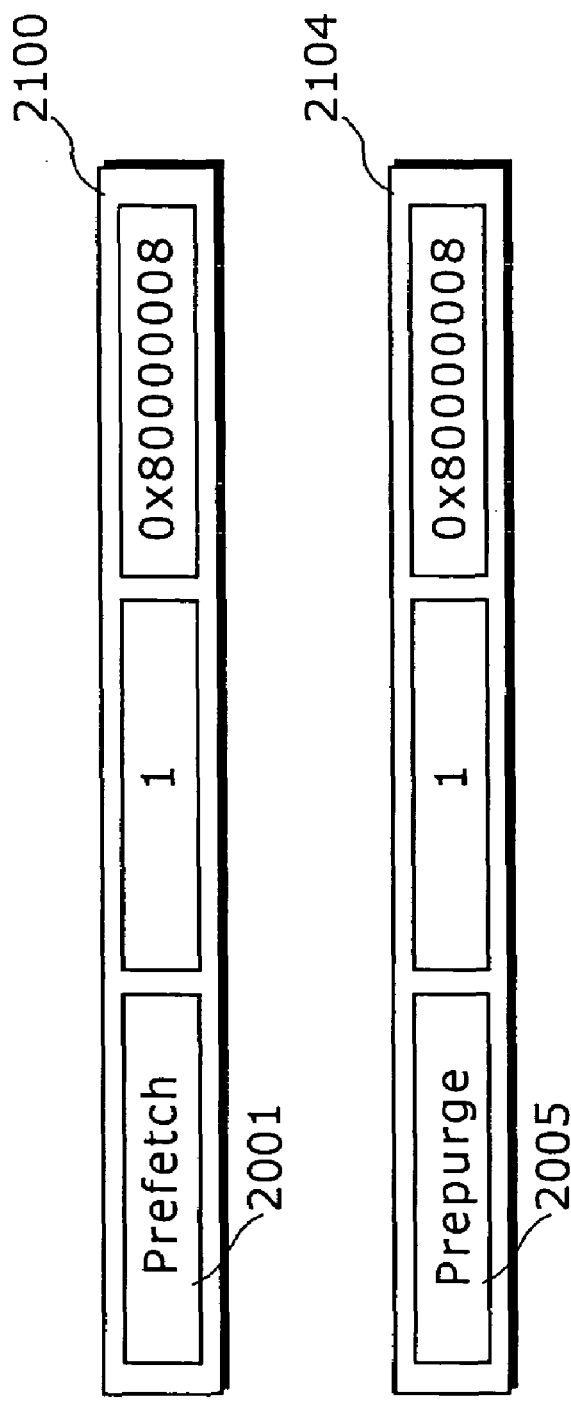

COMPUTER SYSTEM, COMPILER APPARATUS, AND OPERATING SYSTEM

BACKGROUND OF THE INVENTION (1) Field of the Invention

The present invention relates to a computer system, a compiler apparatus, and an operating system, and particularly to a computer system that has a cache memory as well as to a compiler apparatus and an operating system that are used in the computer system.

(2) Description of the Related Art

Recent years have seen a remarkable increase in the computing speed of processors, but the access speed to the main memory has not been increased much, when compared with processors. A widening gap between the processing speeds of processors and main memories has an adverse influence on the improvement in processor performance due to latency in accessing the main memory caused by reading/writing instructions or data.

With the aim of reducing latency in memory access, recent processors are equipped with a lower-capacity memory, known as cache memory, to which a relatively high-speed access can be made, in addition to the main memory. In a computer with such configuration, it is possible to store, on the cache memory, some of the instructions or data stored in the main memory. Accordingly, it becomes possible to reduce latency that occurs when the processor accesses the main memory and therefore to prevent processor performance from being affected by latency.

If there exists a target instruction or data on the cache memory when a processor accesses the main memory, the processor can read/write such target instruction or data with a shorter latency than in the case of making an access to the main memory. If a target instruction or data does not exist on the cache memory, on the other hand, the processor reads/writes such target instruction or data from and to the cache memory after transferring, to the cache memory, some of the instructions or data stored in the memory including the target instruction or data. It takes much time to transfer data from the main memory to the cache memory, but in the general program sequence, it is highly likely that the processor accesses nearby addresses for a certain period of time after making an access to a certain address on the main memory. Because of this fact, it becomes possible to reduce latency if the processor makes an access to the main memory after transferring instructions or data to the cache memory, compared with the case where it makes a direct access to the main memory.

However, when a target instruction or data does not exist on the cache memory, processor processing is required to be suspended while instructions or data are transferred from the main memory to the cache memory, as a result of which the performance of the processor is degraded. In order to prevent such performance degradation, a variety of methods of circumventing cache miss are proposed.

For example, there is disclosed a technique in which a prefetch instruction is inserted into a part of a source program at the time of compiling the source program, and necessary instructions or data are transferred from the main memory to the cache memory before such instructions are executed (See Japanese Laid-Open Patent application No. 11-212802 (FIG. 2) or Japanese Laid-Open Patent application No. 11-306028 (FIG. 1), for example).

However, in the above methods, a prefetch instruction inserted at compile time is executed without exception when a program is executed without taking into consideration a state of the cache memory. This causes a problem that, on a multitasking execution environment, instructions and data used by a program with a higher priority are flushed from the cache memory because of the reason that instructions and data used by a program with a lower priority have been prefetched, and therefore that cache hit rates are lowered.

Furthermore, even when instructions or data used by a program with a lower priority are prefetched, such instructions or data used by the program with a lower priority are flushed from the cache memory while a program with a higher priority is executed, which causes another problem that such prefetch is performed in vain.

SUMMARY OF THE INVENTION

The present invention has been conceived in order to solve the above problems, and it is an object of the present invention to provide a computer system, a compiler apparatus, and an operating system that are capable of improving the hit rate of a cache memory.

Moreover, it is also an object of the present invention to provide a computer system, a compiler apparatus, and an operating system that are capable of preventing unnecessary prefetches from a cache memory from being performed.

The computer system according to the present invention is a computer system including a cache memory that stores one or more instructions and data that are stored in a main memory and a cache memory control unit operable to control the cache memory, wherein the cache memory control unit measures a usage ratio of the cache memory, and controls the cache memory according to said measured usage ratio.

This configuration makes it possible for a program being executed by the processor to know the usage ratio of the cache memory. Accordingly, it becomes possible for such program to perform processing of not performing a prefetch, for example, when the usage ratio of the cache memory is high. As a result, it becomes possible to circumvent the case where instructions or data used by a program with a higher priority is flushed from the cache memory, and therefore to increase the hit rate of the cache memory.

More preferably, the cache memory control unit has a counter that measures a number of valid entries in the cache memory for specifying the usage ratio.

This configuration makes it possible to manage the usage status of the cache memory on a line-by-line or an entry-by-entry basis, and to control memory access by a program.

A computer system according to another aspect of the present invention is a computer system including a plurality of cache memories that correspond to a respective plurality of processors and that store one or more instructions and data that are stored in a main memory, a plurality of cache memory control units that correspond to the respective plurality of cache memories, and an inter-processor communication unit operable to interconnect the plurality of processors, and upon receipt of a command from a first processor in the plurality of processors to manipulate a cache memory corresponding to a second processor that is different from the first processor, output a command to manipulate said cache memory to a cache memory control unit corresponding to the second processor, wherein the plurality of cache memory control units manipulate the respective cache memories based on the command from the inter-processor communication unit. More preferably, this computer system further comprises a processor identification unit operable to identify a processor that is executing a program, wherein upon receipt of information for identifying the second processor, the first processor issues, to the inter-processor communication unit, the command to manipulate the cache memory corresponding to the second processor based on the information for identifying the second processor.

This inter-processor communication unit allows a processor to control the cache memory used by another processor.

More preferably, the processor identification unit is implemented as a machine language instruction that returns unique numbers assigned to the respective plurality of processors.

This configuration makes it possible to easily control plural cache memories on the program.

More specifically, the inter-processor communication unit, upon receipt of the command from the first processor, sends a prepurge instruction or a prefetch instruction to the cache memory corresponding to the second processor.

This configuration allows an efficient use of cache memories and therefore to prevent the degradation of processor performance, even for the configuration with plural processors and corresponding cache memories.

Moreover, the compiler apparatus according to further another aspect of the present invention is a compiler apparatus that converts a source program written in a high-level language into an executable program, including a prefetch target extraction unit operable to extract an instruction or data to be prefetched from a main memory to a cache memory for each of predetermined execution groups in the source program, and generate an address list that lists an address of the extracted instruction or data, and a thread process creation unit operable to (i) analyze a control structure of each of the execution groups in the source program, (ii) select, from the address list, the address of the instruction or data to be prefetched according to a result of the analysis, and (iii) create a prefetch thread for prefetching the instruction or data that is stored in a location specified by the selected address.

With the above configuration, a prefetch thread is created in addition to the main task. By adding a prefetch thread to the source program, it becomes possible to makes an efficient use of the cache memory.

Preferably, the thread process creation unit checks a priority of a task that activates the thread process creation unit, and creates the prefetch thread for executing the prefetch, when a task with a priority higher than the priority is not executed on any processors.

According to the above configuration, a prefetch is allowed to be performed if the priority of a task that has activated the prefetch thread is the highest of all. Accordingly, there does not occur any cases where instructions or data of a task with a higher priority are purged by a task with a lower priority, which makes it possible to increase the hit rate of the cache memory.

More preferably, the thread process creation unit creates the prefetch thread for executing the prefetch only when a usage ratio of the cache memory is equal to or lower than a specified value.

By performing a prefetch only when the usage ratio of the cache memory is equal to or lower than a predetermined value, it becomes possible not to perform any prefetches when the usage ratio of the cache memory is high. As a result, there does not occur any cases where a prefetch is performed unnecessarily, due to the fact that instructions or data to be used by a program with a higher priority are purged from the cache memory since instructions or data of a program with a lower priority have been prefetched.

More preferably, this compiler apparatus further comprises a prefetch timing determination unit operable to determine a prefetch start timing at which a prefetch should start on the source program, based on execution time required for an instruction in an execution group of interest and time related to said prefetch of an instruction or data in a next execution group, said prefetch start timing allowing execution of said prefetch to complete before execution of the instruction in the next execution group starts, wherein the thread activation process insertion unit inserts, at the prefetch start timing on the source program determined by the prefetch timing determination unit, a process for activating a prefetch thread for prefetching the instruction or data in the next execution group.

By inserting a prefetch thread at such timing, the prefetch will have been completed before the execution of the next execution group starts. Accordingly, it becomes possible to increase the hit rate of the cache memory, and to achieve high-speed processing.

The operating system according to another aspect of the present invention is an operating system capable of multitasking, the operating system causing a computer to function as a cache usage ratio monitoring unit operable to monitor a usage ratio of a cache memory, and a task control unit operable to control an execution sequence of tasks executed by a processor, according to the usage ratio of the cache memory.

Accordingly, it becomes possible to change execution sequences of tasks to be executed by the processor. Thus, by executing a task with a higher priority in a preferential manner, when the usage ratio of the cache memory is high, it becomes possible to increase the hit rate of the cache memory and to improve program execution speeds.

Preferably, this operating system further causes the computer to function as a priority checking unit operable to check whether or not there is a task with a higher priority than a priority of a task being executed by the processor, wherein when the usage ratio of the cache memory is greater than a predetermined threshold, the task control unit increases execution frequencies so that an execution frequency of a task with a higher priority becomes higher than the case where the usage ratio of the cache memory is equal to or lower than the predetermined threshold.

Accordingly, by executing a task with a lower priority when the usage ratio of the cache memory is high, it becomes possible to prevent instructions or data of a task with a higher priority from being discarded.

The operating system according to another aspect of the present invention is an operating system for a computer system that is equipped with a plurality of processors, wherein the computer system has a plurality of cache memories that correspond to the respective plurality of processors, and the operating system causes a computer to function as a cache usage ratio monitoring unit operable to monitor usage ratios of the respective plurality of cache memories, and a task control unit operable to control an execution sequence of tasks, according to the usage ratios of the respective plurality of cache memories. Preferably, the task control unit preferentially assigns a task to a processor corresponding to a cache memory whose usage ratio is lowest of all the plurality of cache memories.

This configuration makes it possible to assign tasks to a processor whose usage ratio is lower, which consequently enhances the overall computer performance.

More preferably, this operating system further causes the computer to function as a priority checking unit operable to check whether there exists a task with a higher priority than a priority of each task being executed by each of the plurality of processors, wherein when all of the usage ratios of the respective plurality of cache memories are greater than a predetermined threshold, the task control unit increases execution frequencies so that an execution frequency of a task with a higher priority becomes higher than the case where at least one of said usage ratios is equal to or lower than the predetermined threshold.

This configuration allows even a multiprocessor system to control plural cache memories on a task-by-task basis in consideration of task priorities.

Note that not only is it possible to embody the present invention as the computer systems, compiler apparatus, and operating systems described above, but also as a compiler and a program that includes characteristic instructions. It should be also noted that such program can be distributed on recording media such as Compact Disc-Read Only Memory (CD-ROM) and via transmission media such as the Internet.

According to the present invention, it is possible to increase the hit rate of cache memories, prevent unnecessary prefetches from a cache memory from being performed, control memory access from a program executed on the processor, allow a processor to control the cache memory used by another processor in a multiprocessor computer system, make an efficient use of cache memories and to prevent the degradation of processor performance, even when there are plural processors and corresponding cache memories, prevent instructions or data of a task with a higher priority from being flushed from the cache memory. Using the above compiler apparatus, programmers are enabled to develop programs for performing prefetches without needing to be aware of the presence of a cache memory, which facilitates the development of programs with high execution speed and allows a task with a higher priority to make an efficient use of a cache memory, and therefore to facilitate the development of programs with high execution speed.

The disclosure of Japanese Patent Application No. 2003-306437 filed on Aug. 29, 2003 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 9 is a diagram showing an example source code to be compiled;

FIG. 21A is a diagram showing a concrete example of the prefetch instruction shown in FIG. 20A;

FIG. 21B is a diagram showing a concrete example of the prepurge instruction shown in FIG. 20B.

DESCRIPTION OF THE PREFERRED EMBODIMENTS

First Embodiment

The following gives a detailed description of a computer system according to the first embodiment of the present invention with reference to the drawings.

(1) Hardware Configuration

Figure 1:
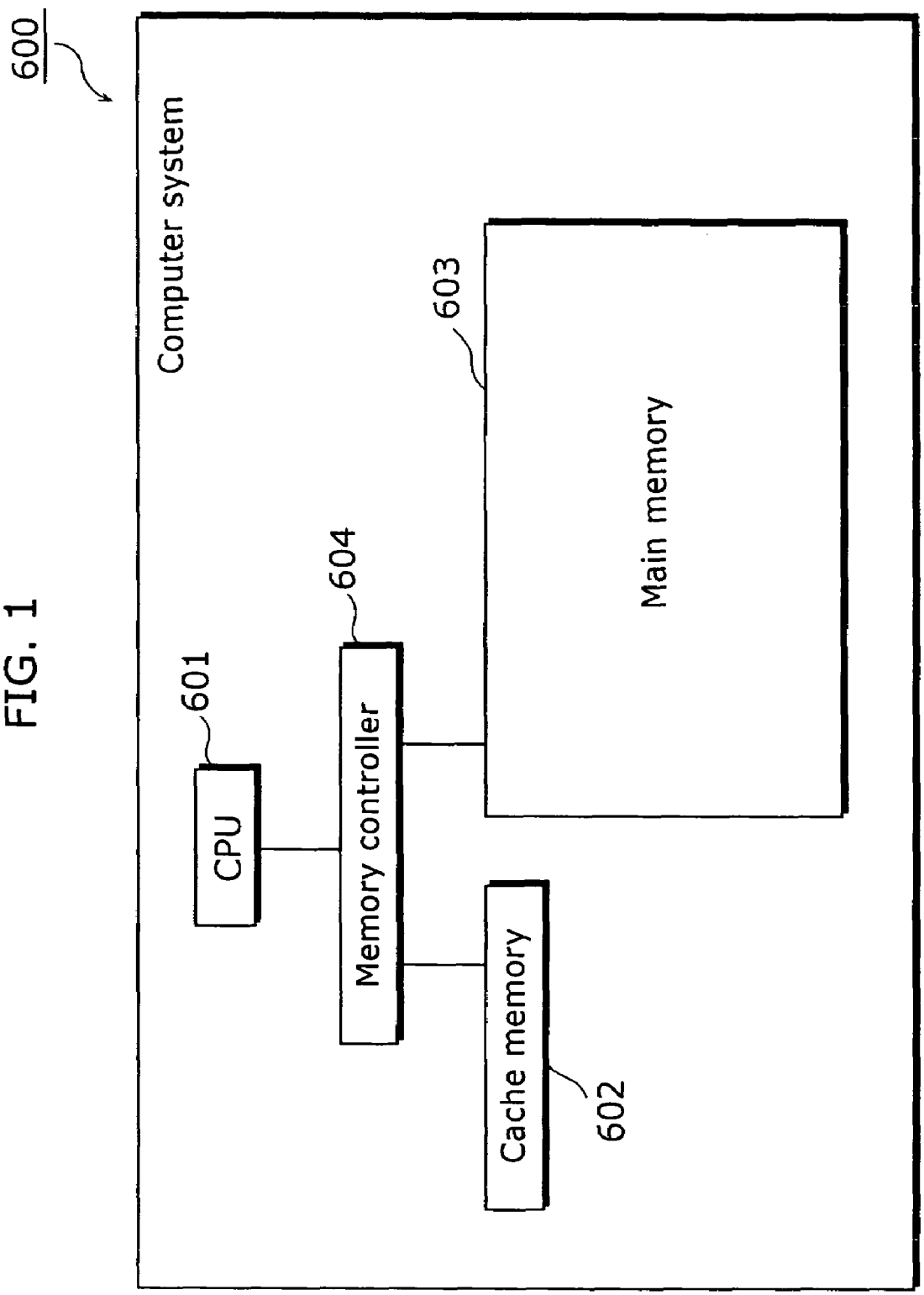
FIG. 1 is a diagram showing a hardware configuration of a computer system according to a first embodiment of the present invention.

FIG. 1 is a diagram showing a hardware configuration of the computer system according to the first embodiment of the present invention. As FIG. 1 shows, a computer system 600 according to the present invention is formed of a CPU 601, a memory controller 604, a cache memory 602, and a main memory 603.

The main memory 603 is a large-capacity storage device, to which an access can be made at a low speed, for storing instructions and data. The cache memory 602 is a small-capacity storage device, to which an access can be made at a high speed, for temporarily storing instructions and data that are stored in some of the locations on the main memory 603. The CPU 601 is an arithmetic unit that executes instructions stored in the main memory 603 or the cache memory 602 and that reads and writes data to and from the main memory 603 or the cache memory 602. The memory controller 604 is a control device that controls access between the main memory 603 and the cache memory 602 and that controls access between the CPU 601 and the cache memory 602 as well as the main memory 603.

Figure 2:
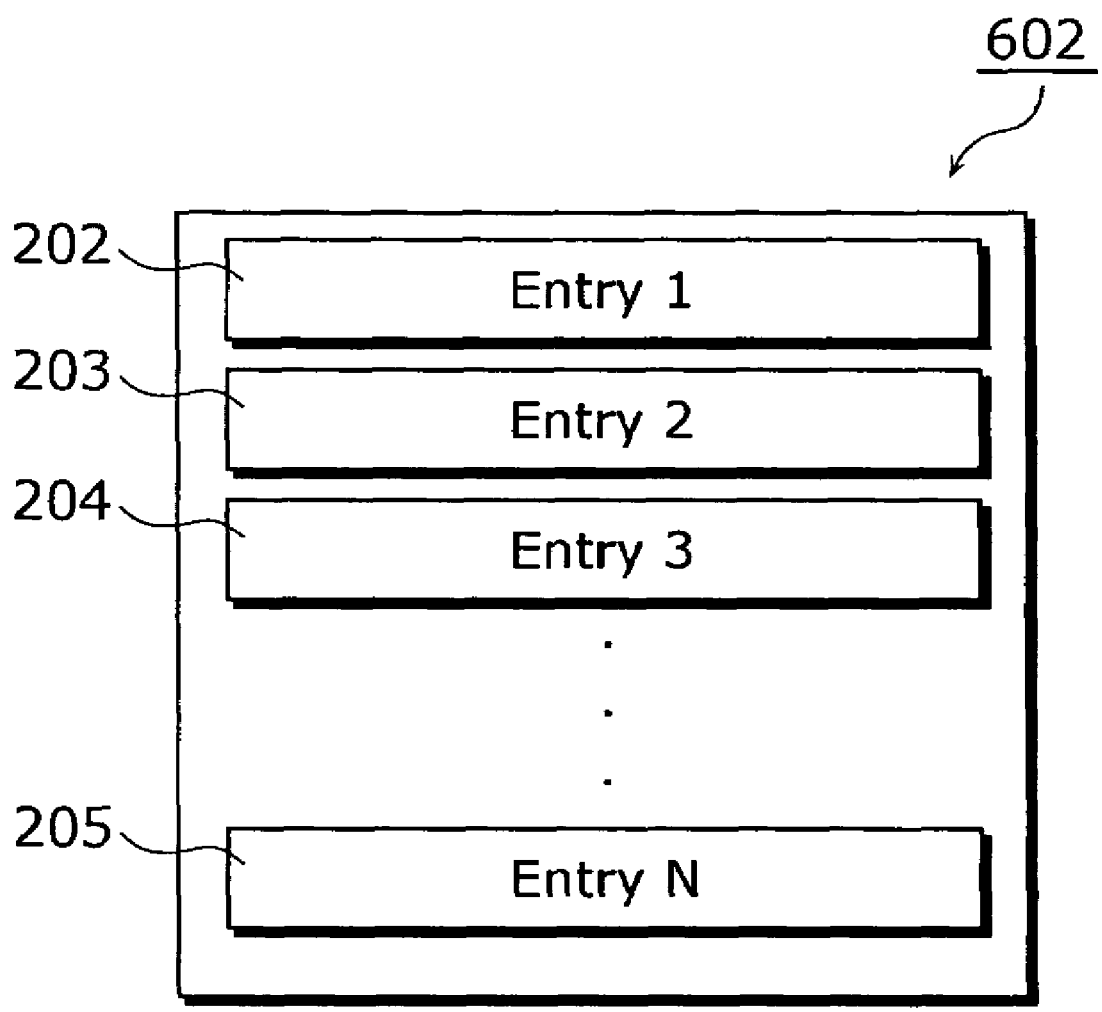
FIG. 2 is a diagram for explaining storage locations in a cache memory.

FIG. 2 is a diagram for explaining storage locations in the cache memory 602 shown in FIG. 1. The cache memory 602, which stores data on an entry-by-entry basis, is made up of N entries 202, 203, 204, and 205.

Figure 3:
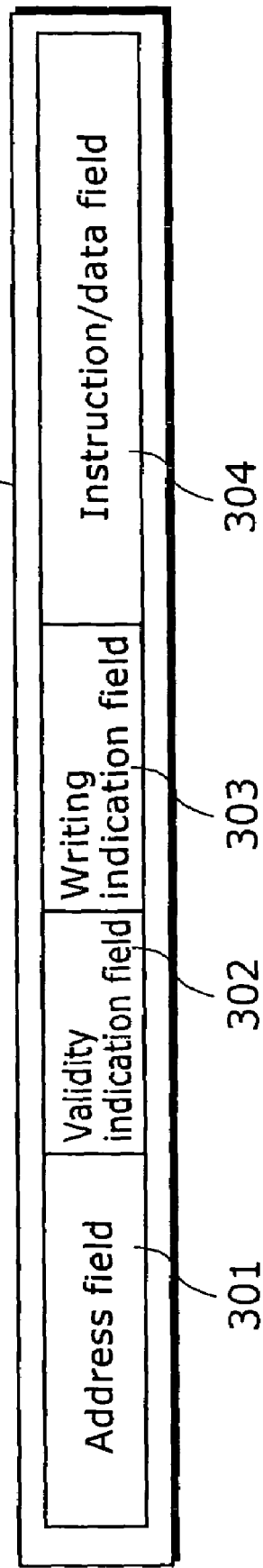
FIG. 3 is a diagram for explaining the details of an entry that constitutes the cache memory shown in FIG. 2.

FIG. 3 is a diagram for explaining an entry in the cache memory 602 shown in FIG. 2. The entry 205 (202, 203, and 204) is made up of an instruction/data field 304, an address field 301, a validity indication field 302, and a writing indicating field 303.

Stored in the instruction/data field 304 are instructions or data. Stored in the address field 301 is an address in the main memory 603 corresponding to the instructions or data stored in the instruction/data field 304.

Stored in the validity indication field 302 is a bit that indicates whether or not the instructions or data stored in the entry are valid. The validity indication field 302 has a 1-bit element. It indicates that valid instructions or data are stored in the entry if the value of such bit is 1, whereas it indicates that valid instructions or data are not stored in the entry if the value of such bit is 0.

Stored in the writing indication field 303 is a bit that indicates whether or not writing has been performed to the entry. The writing indication field 303 has a 1-bit element. It indicates that writing has been performed to the entry if the value of such bit is 1, whereas it indicates that no writing has been performed to the entry if the value of such bit is 0.

The main memory 603 in FIG. 1 is comprised of 32-bit address spaces, for example, which are divided into "lines" on a 16 byte basis. In this case, instructions or data equivalent to one line are stored in one entry in the cache memory 602. For example, when data stored in the main memory 603 at an address 0x80000008 is transferred from the main memory 603 to the cache memory 602, the memory controller 604 exercises control so that 16-byte instructions or data stored in the main memory 603 at addresses from 0x80000000 to 0x8000000F. are transferred all at once to the cache memory 602.

Figure 4:
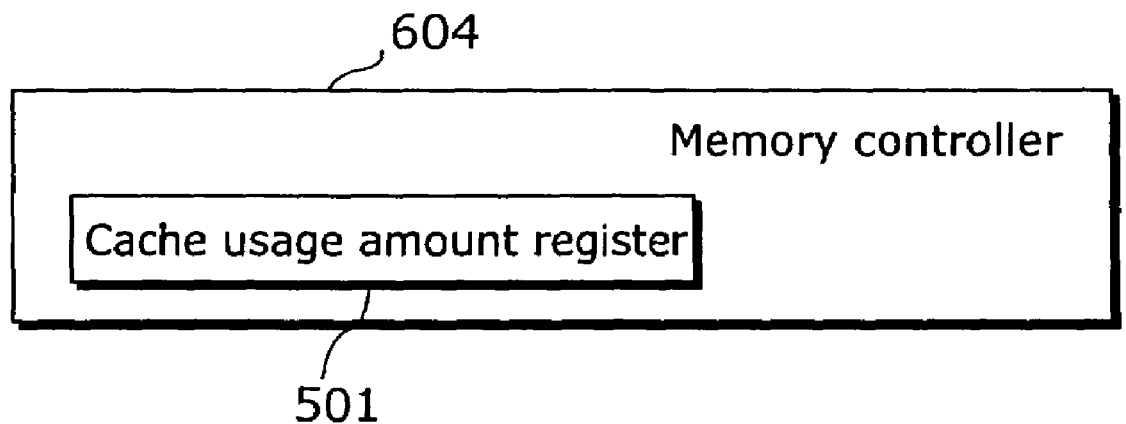
FIG. 4 is a schematic diagram showing a memory controller.

FIG. 4 is a schematic diagram showing the memory controller 604 shown in FIG. 1. As FIG. 4 shows, the memory controller 604 has a cache usage amount register 501. Stored in this cache usage amount register 501 is the number of entries whose bit in the validity indication field 302 indicates validity. In other words, the number of entries stored in the cache usage amount register 501 is incremented by one when a bit of the validity indication field 302 of an entry in the cache memory 602 changes from invalid to valid, whereas it is decremented by one when a bit of the validity indication field 302 of an entry in the cache memory 602 changes from valid to invalid. Software executed by the CPU 601 can know how much of the cache memory 602 is used, by referring to such number of entries stored in the cache usage amount register 501.

Figure 5:
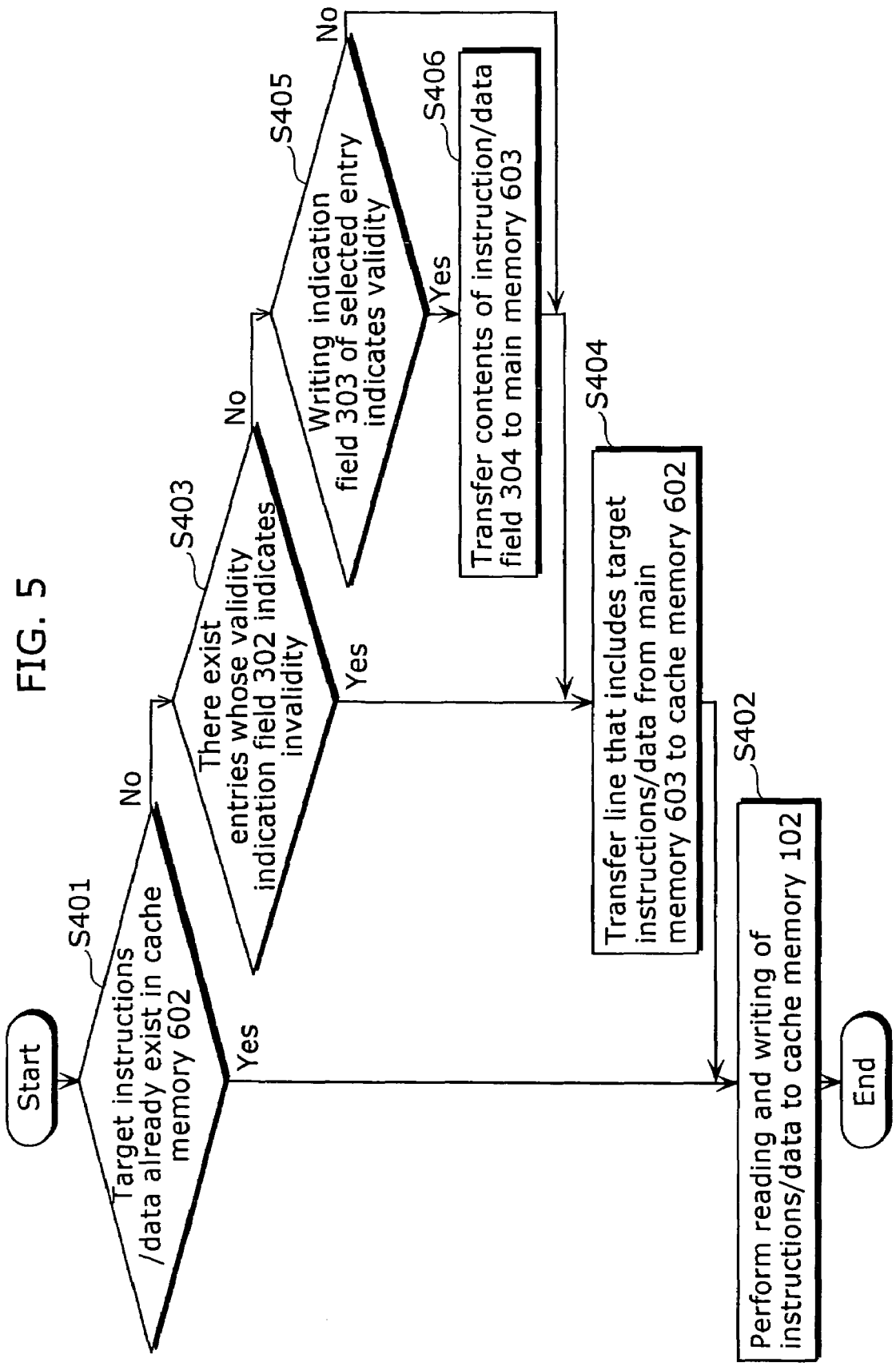
FIG. 5 is a flowchart showing an operation performed by the memory controller.

FIG. 5 is a flowchart showing an operation performed by the memory controller 604 when the CPU 601 reads and writes instructions or data from and to the cache memory 602 or the main memory 603. According to the flowchart shown in FIG. 5, the memory controller 604 controls access to instructions or data between the cache memory 602 and the main memory 603 in accordance with a fully associative scheme.

Upon receipt of a memory access request from the CPU 601, the memory controller 604 checks whether or not there exits any instructions or data in the cache memory 602 corresponding to an address to which a memory access is requested (S401). Stated another way, the memory controller 604 checks whether or not there is any entry whose address field 301 stores an address that is the same as the address to which memory access is requested, out of the entries on the cache memory 602 whose bit in the validity indication field 302 indicates validity. When there exists an entry that includes the target address (Yes in S401), the memory controller 604 exercises control so that instructions or data are read from or written to the above entry on the cache memory 602 (S402).

When the address field 301 in none of the valid entries stores an address that matches the target address (No in S401), the memory controller 604 checks whether or not there exists any entry whose bit in the validity indication field 302 indicates invalidity (S403). When there exist entries whose bit in the validity indication field 302 is invalid (Yes in S403), the memory controller 604 chooses one of such entries, and transfers, to such chosen entry, instructions or data stored in a line that includes the target address on the main memory 604 (S404). At the same time, the memory controller 604 writes the target address to the address field 301 of the entry to which instructions or data have been transferred. Furthermore, the memory controller 604 sets the bit of the validity indication field 302 of such entry to valid and sets the bit of the writing indication field 303 of such entry to invalid.

When the bits of the validity indication fields 302 of all the entries indicate validity, the memory controller 604 chooses an entry whose contents should be changed (hereinafter referred to as "target entry") by use of the Least Recently Used (LRU) algorithm, and checks whether the bit of the writing indication field 303 of the target entry indicates validity or not (S405). When the writing indication field 303 indicates validity (Yes in S405), the memory controller 604 transfers, to the main memory 603, the contents of the instruction/data field 304 of the target entry (S406). After that, the memory controller 604 writes instructions or data to the target entry, according to the procedure equivalent to that of the above rewrite processing (S404).

When the writing indication field 303 of the target entry indicates invalidity (No in S405), the memory controller 604 writes instructions or data to the target entry, according to the procedure equivalent to that of the above rewrite processing (S404), without performing transfer processing (S406) to the main memory 603.

Figure 6A:
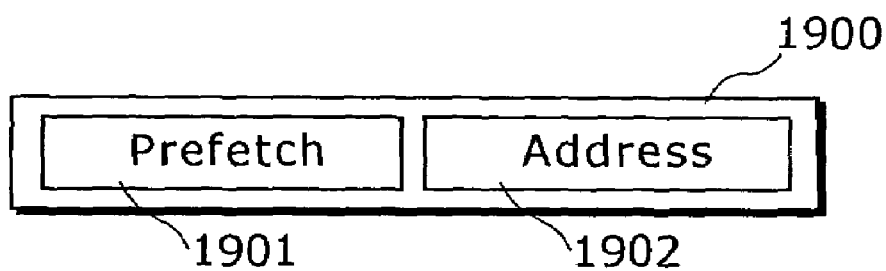
FIG. 6A is a diagram for explaining a prefetch instruction.
Figure 6B:
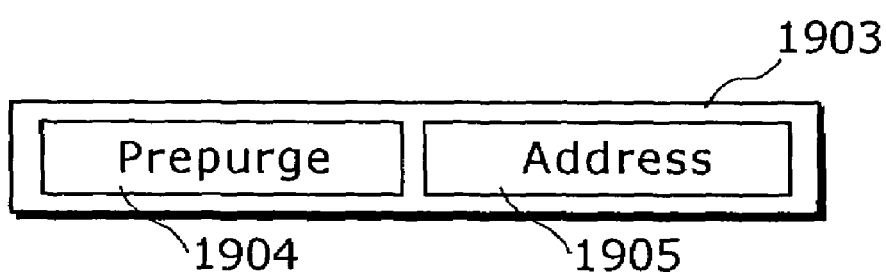
FIG. 6B is a diagram for explaining a prepurge instruction.

FIGS. 6A and 6B are diagrams for respectively explaining prefetch instruction and prepurge instruction that are executed by the CPU 601. It is possible for the CPU 601 to explicitly manipulate the cache memory 602 by executing a prefetch instruction 1900 or a prepurge instruction 1903, in addition to an ordinary memory access instruction.

As FIG. 6A shows, the prefetch instruction 1900, which is represented by an operation code 1901 "Prefetch", is an instruction for transferring, to the cache memory 602, a line on the main memory 603 that includes an address represented by an operand 1902 "Address", in accordance with the procedure equivalent to the one that is followed in the case where there has been an access from the CPU 601 to the main memory 603.

As FIG. 6B shows, the prepurge instruction 1903, which is represented by an operation code 1904 "Prepurge", is an instruction for invalidating the validity indication field 302 of an entry out of entries on the cache memory 602 whose bits in the validity indication fields 302 indicate validity, if an address of such entry in the address field 301 matches the address specified by an operand 1905 "Address". However, when the bit of the writing indication field 303 indicates validity, the validity indication field 302 is invalidated by this instruction, after data is transferred from the cache memory 602 to the main memory 603.

(2) Configuration of Operating System

Figure 7:
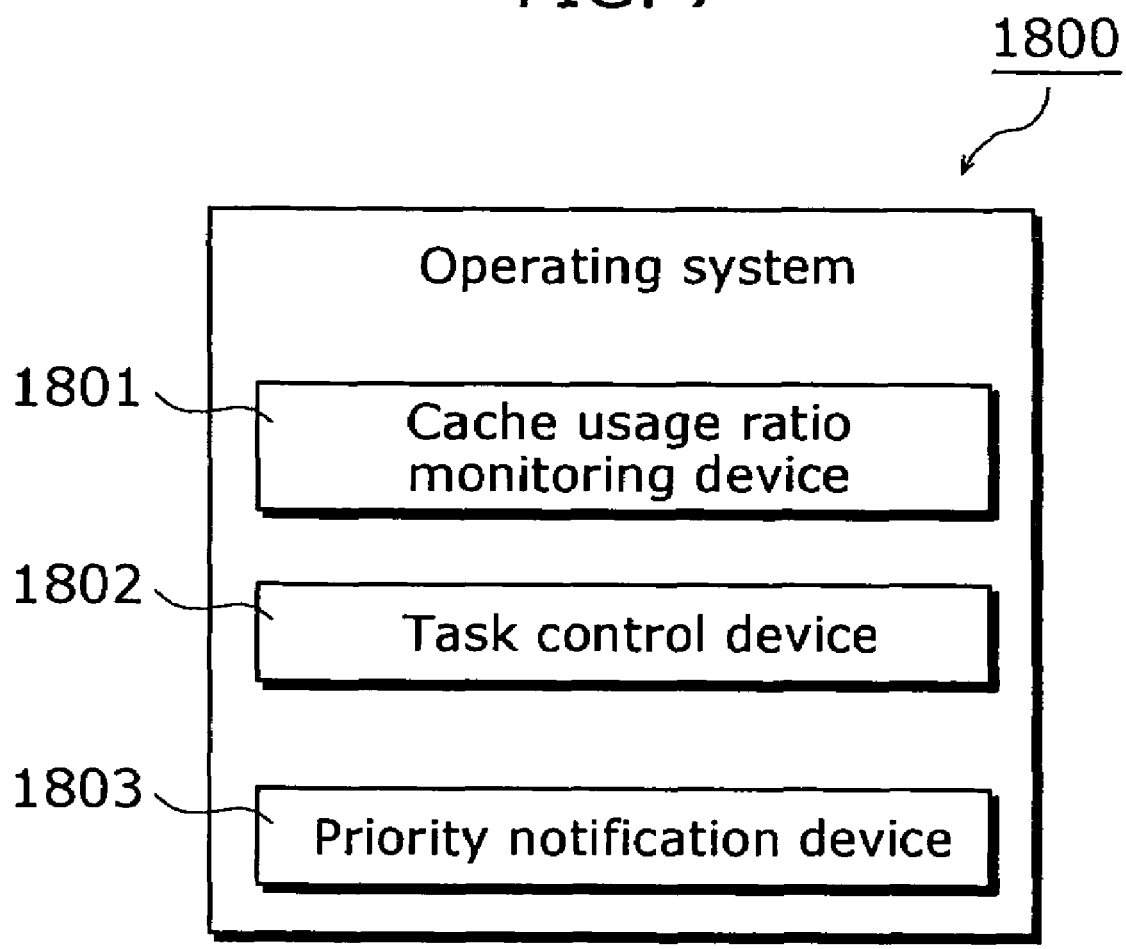
FIG. 7 is a diagram showing a configuration of an operating system that is used in the computer system according to the first embodiment of the present invention.

FIG. 7 is a diagram showing the configuration of an operating system that is used in the computer system 600 according to the first embodiment of the present invention. An operating system 1800, which is a general control program capable of multitasking, is equipped with a cache usage ratio monitoring device 1801, a task control device 1802, and a priority notification device 1803. Each of these devices is implemented as a program to be executed on the CPU 601.

The cache usage ratio monitoring device 1801 monitors a usage ratio of the cache memory 602, by referring to the cache usage amount register 501 of the memory controller 604.

The task control device 1802 exercises control so that one task is switched to another task in plural tasks for execution at predetermined time intervals. Each of the tasks being executed is given a priority. The task control device 1802 switches tasks so that a longer execution time is provided to a task with a higher priority. However, when a usage ratio of the cache memory 602 monitored by the cache usage ratio monitoring device 1801 exceeds a specified value, the task control device 1802 reduces the frequency at which a task with a lower priority is executed, and increases instead the frequency at which a task with a higher priority is executed. Here, the above-mentioned specified value is a value that depends on the type of an application to be supported as well as the type of a program sequence, and therefore it is preferable that an arbitrary numeric value can be set as such value.

The priority notification device 1803 provides a notice indicating whether or not there is a task with a higher priority than that of a task in execution, in response to an inquiry from such task in execution. Note that the priority notification device 1803 may also be an application programming interface (API) that returns a true value if there exists a task with a higher priority than that of the calling task that has made the above inquiry and returns a false value if there is no task with a higher priority.

(3) Configuration of Compiler

Figure 8:
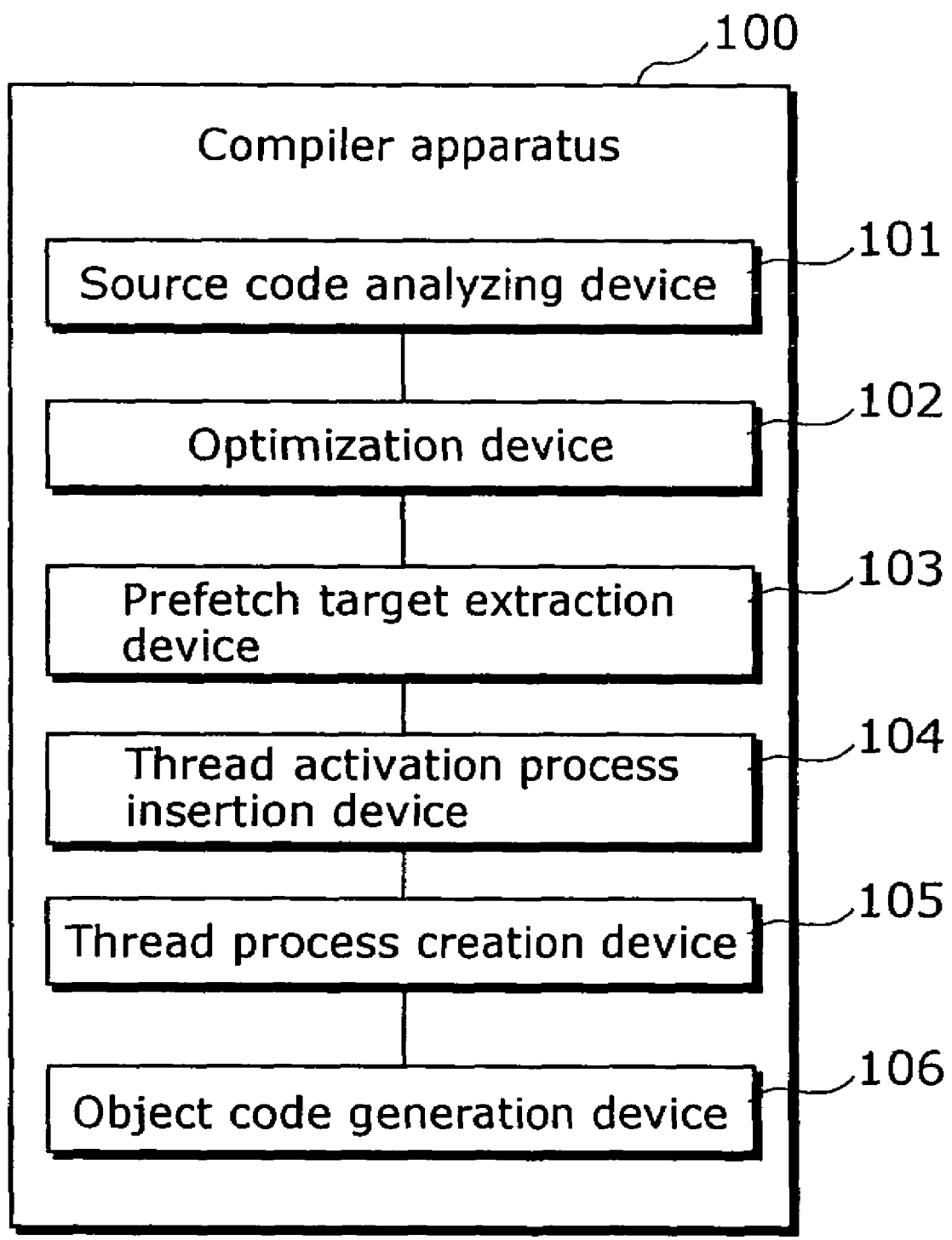
FIG. 8 is a diagram showing a configuration of a compiler apparatus that generates a program to be executed by a CPU in the computer system.

FIG. 8 is a diagram showing a configuration of a compiler apparatus that generates a program to be executed by the CPU 601 in the computer system 600. A compiler apparatus 100, which is a program for converting a source program into a program in executable form, is comprised of a source code analyzing device 101, an optimization device 102, a prefetch target extraction device 103, a thread activation process insertion device 104, a thread process creation device 105, and an object code generation device 106. These devices are implemented as programs to be executed on the CPU 601 and are configured so that they operate in a sequential manner.

The compiler apparatus 100 divides a source program into blocks called "basic blocks" and performs compilation processing on a basic block basis. Basic block is a group of instructions that include no branch instruction and that therefore operate sequentially without exception. A source code 700 as shown in FIG. 9, for example, is divided into basic blocks 801, 802, 803, 804, and 805 shown in FIG. 10, on which compilation processing is performed on a basic block basis.

The source code analyzing device 101 reads in a source program written by programmers, performs syntax analysis and semantic analysis on such source program, and generates intermediate codes.

The optimization device 102 optimizes the intermediate codes generated by the source code analyzing device 101 so that the sizes and execution times of the executable codes to be generated at the final stage become small and short.

The prefetch target extraction device 103 extracts a variable to be prefetched. A detailed description of the prefetch target extraction device 103 is given later.

The thread activation process insertion device 104 inserts processes for activating a prefetch thread and a prepurge thread. A detailed description of the thread activation process insertion device 104 is given later.

The thread process creation device 105 creates a prefetch thread and a prepurge thread. Detailed descriptions of a prefetch thread and a prepurge thread created by the thread process creation device 105 are given later.

The object code generation device 106 generates executable codes from the intermediate codes which are generated and optimized respectively by the source code analyzing device 101 and the optimization device 102, and to which a prefetch thread and a prepurge thread are inserted by the prefetch target extraction device 103, the thread activation process insertion device 104, and the thread process creation device 105.

Detailed descriptions of the source code analyzing device 101, the optimization device 102, and the object code generation device 106 are not given here, since they are not the main subject of the present invention and their operations are the same as those performed by an existing compiler.

Figure 11:
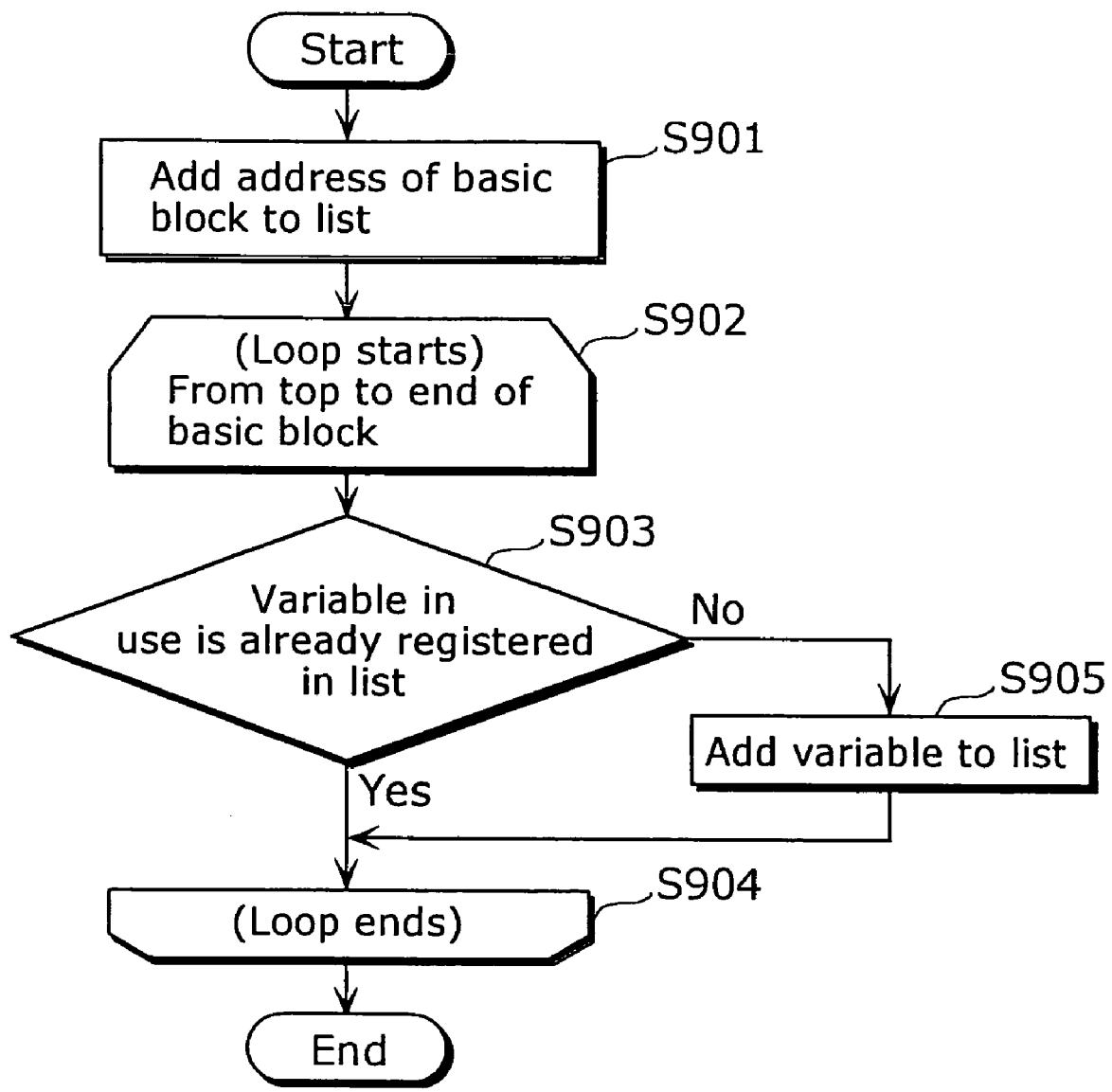
FIG. 11 is a flowchart showing an operation of the prefetch target extraction device shown in FIG. 8.
Figure 12B:
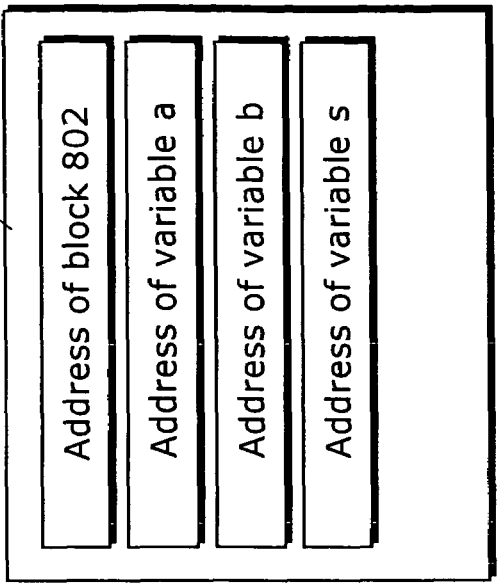
FIGS. 12A~12D are diagrams showing prefetch target lists that are created from the respective basic blocks shown in FIG. 10.
Figure 12D:
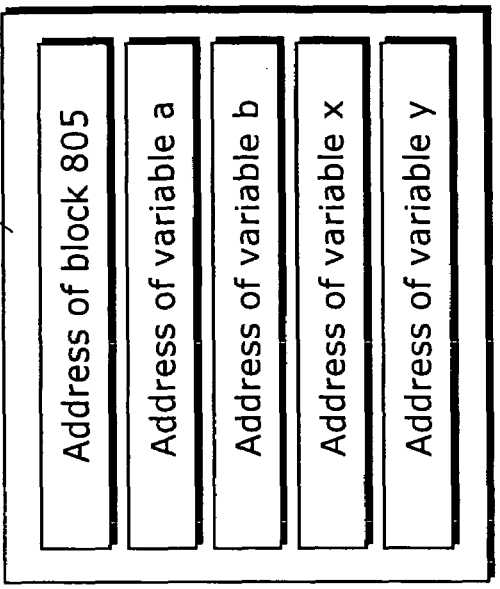
Figure 12A:
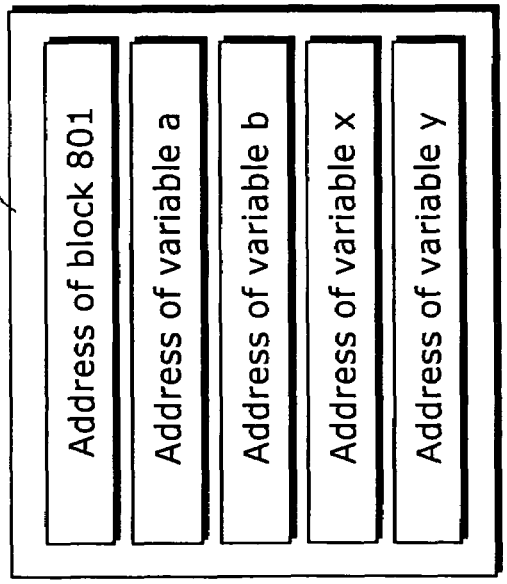
Figure 12C:
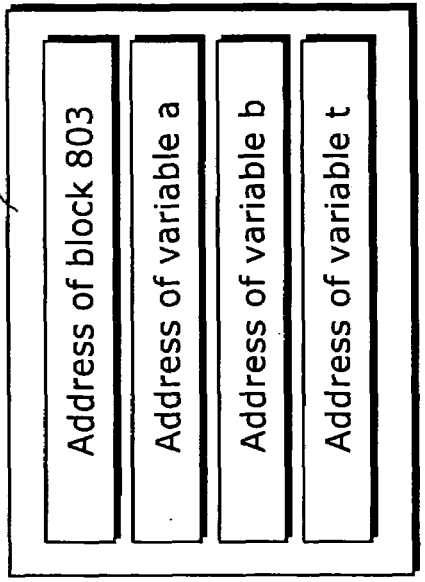

FIG. 11 is a flowchart showing an operation of the prefetch target extraction device 103 shown in FIG. 8. The prefetch target extraction device 103 creates a prefetch target list corresponding to each basic block, in accordance with the flowchart shown in FIG. 11. Prefetch target list is a list in which a set of the address of a basic block to be prefetched and the addresses of variables included in such basic block are stored.

The prefetch target extraction device 103 extracts the address of a line in which instructions included in a basic block are stored, and adds it to the prefetch target list (S901). In the case where instructions of a basic block cannot be stored in one line, the prefetch target extraction device 103 adds the addressees of plural lines to the prefetch target list.

The prefetch target extraction device 103 checks whether or not the address of a variable used in the basic block is already registered in the prefetch target list (S903). If not (No in S901), the prefetch target extraction device 103 registers the address of the variable in the prefetch target list (S903). The prefetch target extraction device 103 iterates such processing for registering the address of a variable to the prefetch target list (S903 and S905) from the top through the end of the basic block (S902~S904), and then terminates the processing. However, it is impossible, at compile time, to determine addresses on the memory where variables and instructions are to be placed. Thus, the present invention is configured so that temporary address information is stored in a prefetch target list, which is then rewritten to actual address information at the time of linking object files, when an actual address is determined.

Figure 10:
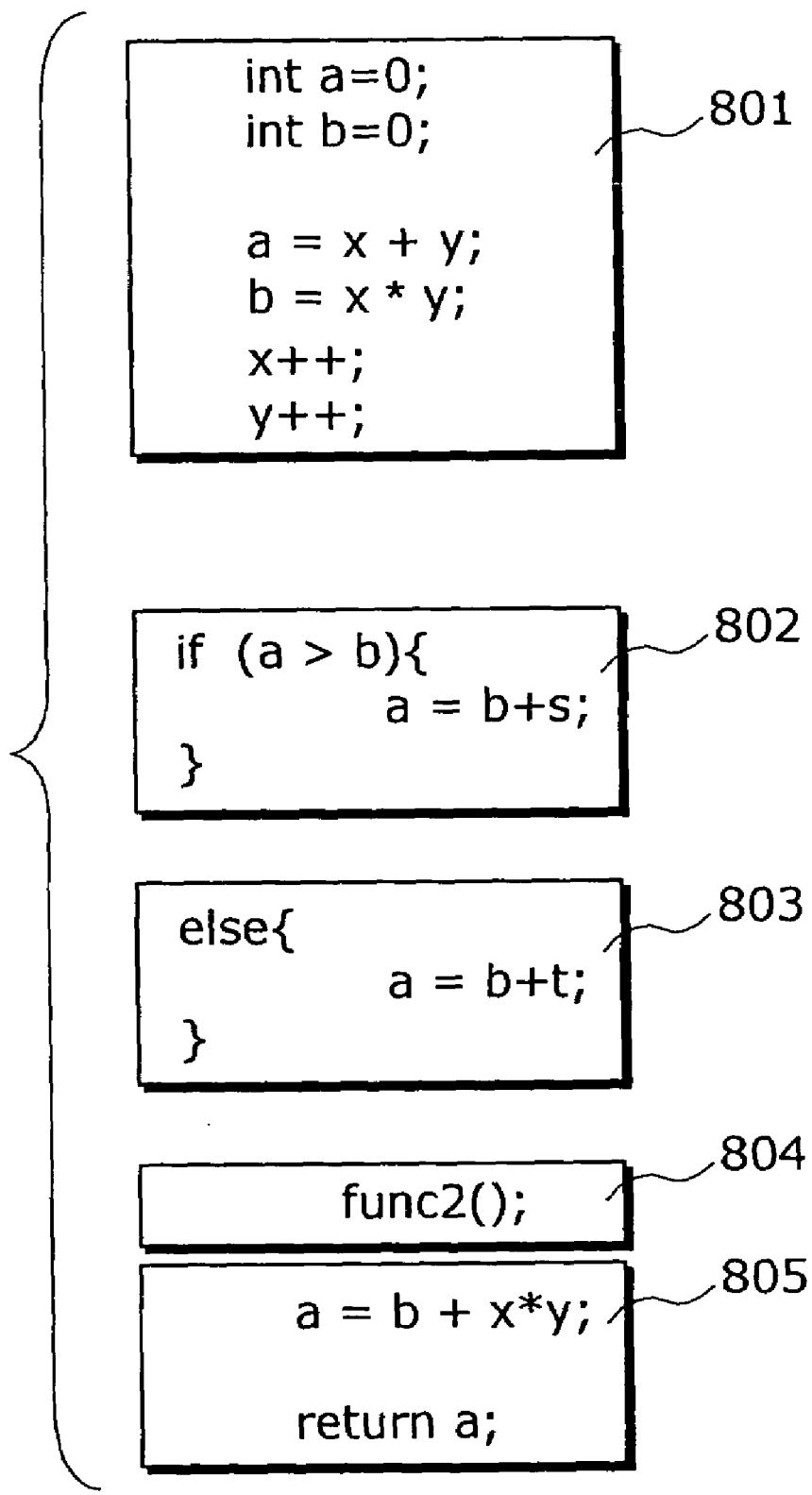
FIG. 10 is a diagram showing the source code shown in FIG. 9 that is divided on a basic block basis.

FIGS. 12A~12D are diagrams showing prefetch target lists that are created from the respective basic blocks 801, 802, 803, and 805 shown in FIG. 10, according to the procedure shown in FIG. 11. Prefetch target lists 1001, 1002, 1003, and 1004 are created in association with the respective basic blocks 801, 802, 803, and 805 shown in FIG. 10. Note, however, that the prefetch target list corresponding to the basic block 804 is created when a function func2 is compiled, and therefore it is not created when a function fund is compiled.

Figure 13:
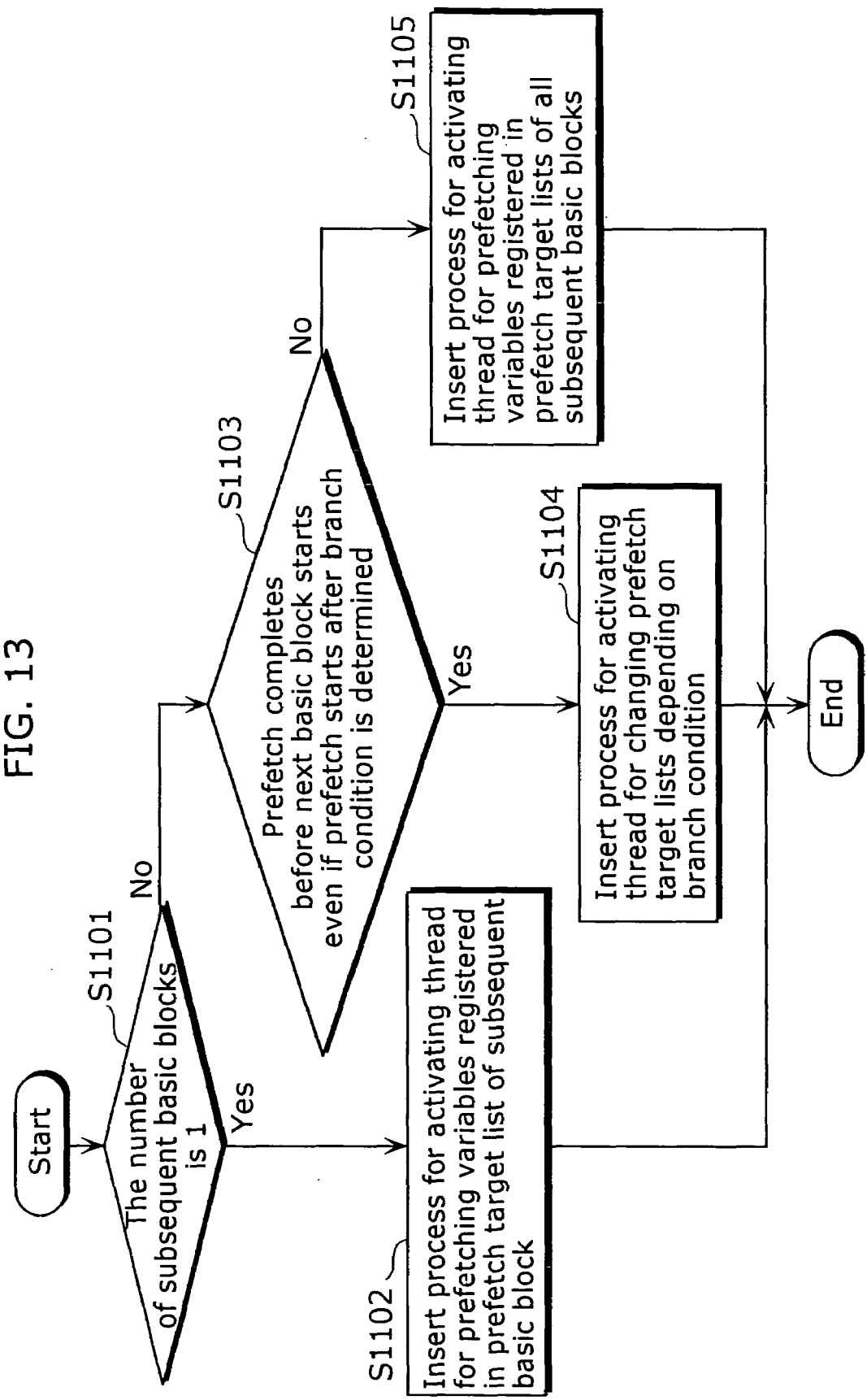
FIG. 13 is a flowchart showing processing performed by the thread activation process insertion device shown in FIG. 8.

FIG. 13 is a flowchart showing processing performed by the thread activation process insertion device 104 shown in FIG. 8 when inserting a process for activating a prefetch thread. Processing shown in FIG. 13 is performed on a basic block basis. The thread activation process insertion device 104 checks whether or not the number of subsequent basic blocks of the basic block being processed is one (S1101). If the number of subsequent basic blocks is one (Yes in S1101), the thread activation process insertion device 104 inserts, into a location that enables the prefetch of variables registered in the prefetch target list of the subsequent basic block to complete before the execution of such subsequent basic block starts, a process for activating a thread for prefetching such variables (S1102).

When there are two or more subsequent basic blocks (No in S1101), it means that a branch condition exists in the basic block of interest. For this reason, the thread activation process insertion device 104 judges whether or not a prefetch completes before processing of the subsequent basic block starts, even if such prefetch starts after a branch condition is determined for deciding which basic block is to be executed next (S1103). When judging that the prefetch completes before processing of the subsequent basic block starts (Yes in S1103), the thread activation process insertion device 104 inserts a process for activating a thread for prefetching variables registered in the prefetch target list of the subsequent basic block, depending on subsequent basic block that is determined by the branch condition (S1104). Note that the thread activation process is inserted immediately after the values of variables used for making a judgment on the branch condition are determined. Accordingly, the prefetch completes before processing of the subsequent basic block starts. For example, taking the basic block 801, the values of variables a and b are determined after assignment statements "a=x+y;" and "b=x*y;" are executed. At this point of time, a branch condition is determined for deciding which one of the basic blocks 802 and 803 is to be executed. Thus, a process for activating a prefetch thread is inserted in a location immediately after where the assignment statement "b=x*y;" is executed.

When judging that the prefetch will not complete before processing of the subsequent basic block starts (No in S1103), the thread activation process insertion device 104 inserts a process for activating threads for prefetching variables registered in the prefetch target lists of all the subsequent basic blocks, before a branch condition is determined (S1105). Note that the thread activation process is inserted into a location that enables the prefetches to complete before processing of the subsequent basic blocks start.

For example, in the case of the source code 700 shown in FIG. 9 and the basic blocks 801, 802, 803, and 805 shown in FIG. 10, either the basic block 802 or the basic block 803 is executed after the basic block 801, depending on branch condition that is determined based on the size relationship between the variable a and the variable b. The values of the variables a and b used in the branch condition are determined in the basic block 801. Thus, assuming that it takes 20 machine cycles from when the value of b is determined to when the execution of either the basic block 802 or 803 starts and that it takes 10 machine cycles for a prefetch, the thread activation process insertion device 104 judges that the prefetch completes before the next basic block, which is either the basic block 802 or 803, is to be activated. Therefore, the thread activation process insertion device 104 inserts a process for activating a prefetch thread before processing for determining the value of the variable b is executed.

On the other hand, assuming that it takes 10 machine cycles from when the value of the variable b is determined until when the execution of the basic block 802 or 803 starts and that it takes 20 machine cycles for a prefetch, the thread activation process insertion device 104 inserts a process for activating prefetch threads corresponding to the respective basic blocks 802 and 803. Furthermore, a process for activating a prepurge thread is inserted at the end of a basic block, but a description of this is given later.

Figure 14:
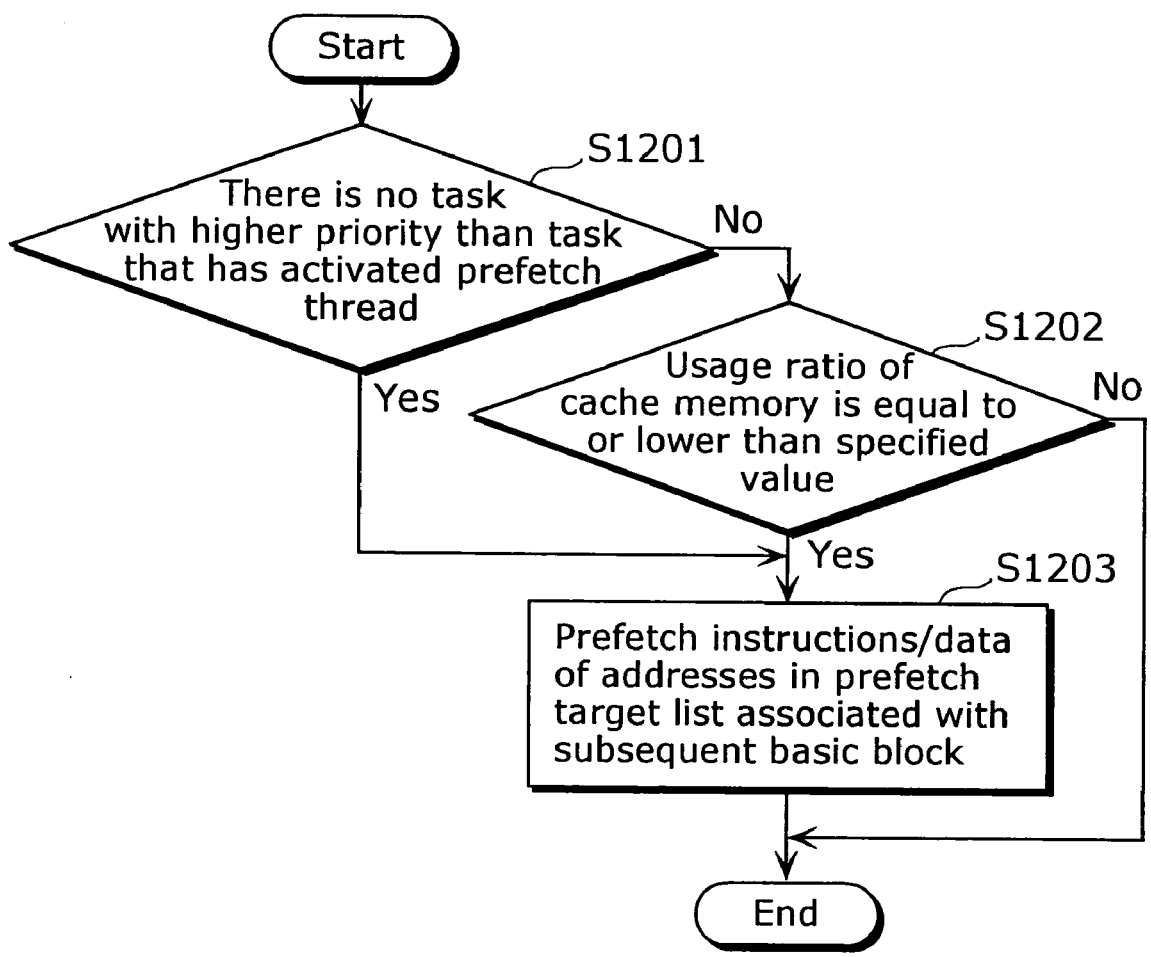
FIGS. 14 and 15 are flowcharts showing processing in a prefetch thread created by the thread process creation device shown in FIG. 8.

FIG. 14 is a flowchart showing processing in a prefetch thread generated by the thread process creation device 105 shown in FIG. 8. A prefetch thread shown in FIG. 14 is a prefetch thread that does not change basic blocks to be prefetched depending on branch condition (thread that is activated in the process for activating a prefetch thread shown in FIG. 13 (S1102 and S1105)).

The prefetch thread makes an inquiry to the operating system 1800 about whether or not a task with a higher priority than that of the task which has activated such prefetch thread is being executed (S1201). If a task with a higher priority than that of the calling task that has made the above inquiry is not being executed (Yes in S1201), the prefetch thread prefetches, from the main memory 603, instructions and data of addresses registered in a prefetch target list (S1203).

If a task with a higher priority is being executed (No in S1201), the prefetch thread checks the value held in the cache usage amount register 501 to see whether the value indicating the usage ratio of the cache memory 602 is equal to or lower than a specified value (S1202). If the usage ratio of the cache memory 602 is equal to or lower than the specified value (Yes in S1202), the prefetch thread prefetches, from the main memory 603, instructions and data of addresses registered in the prefetch target list (Yes in S1203). If the usage ratio of the cache memory 602 exceeds the specified value (No in S1202), the prefetch thread terminates the processing.

Note that the above-mentioned specified value is a value that depends on the type of an application to be supported as well as the type of a program sequence, and therefore it is preferable that an arbitrary numeric value can be set as such value.

As described above, by determining whether or not to execute prefetch in consideration of priorities and the usage ratio of the cache memory, it is possible to prevent instructions and data used by a task with a higher priority from being flushed from the cache memory 602. Accordingly, it becomes possible to increase the hit rate of the cache memory 602 and therefore to make an efficient use of the cache memory 602. This consequently allows high-speed processing.

Figure 15:
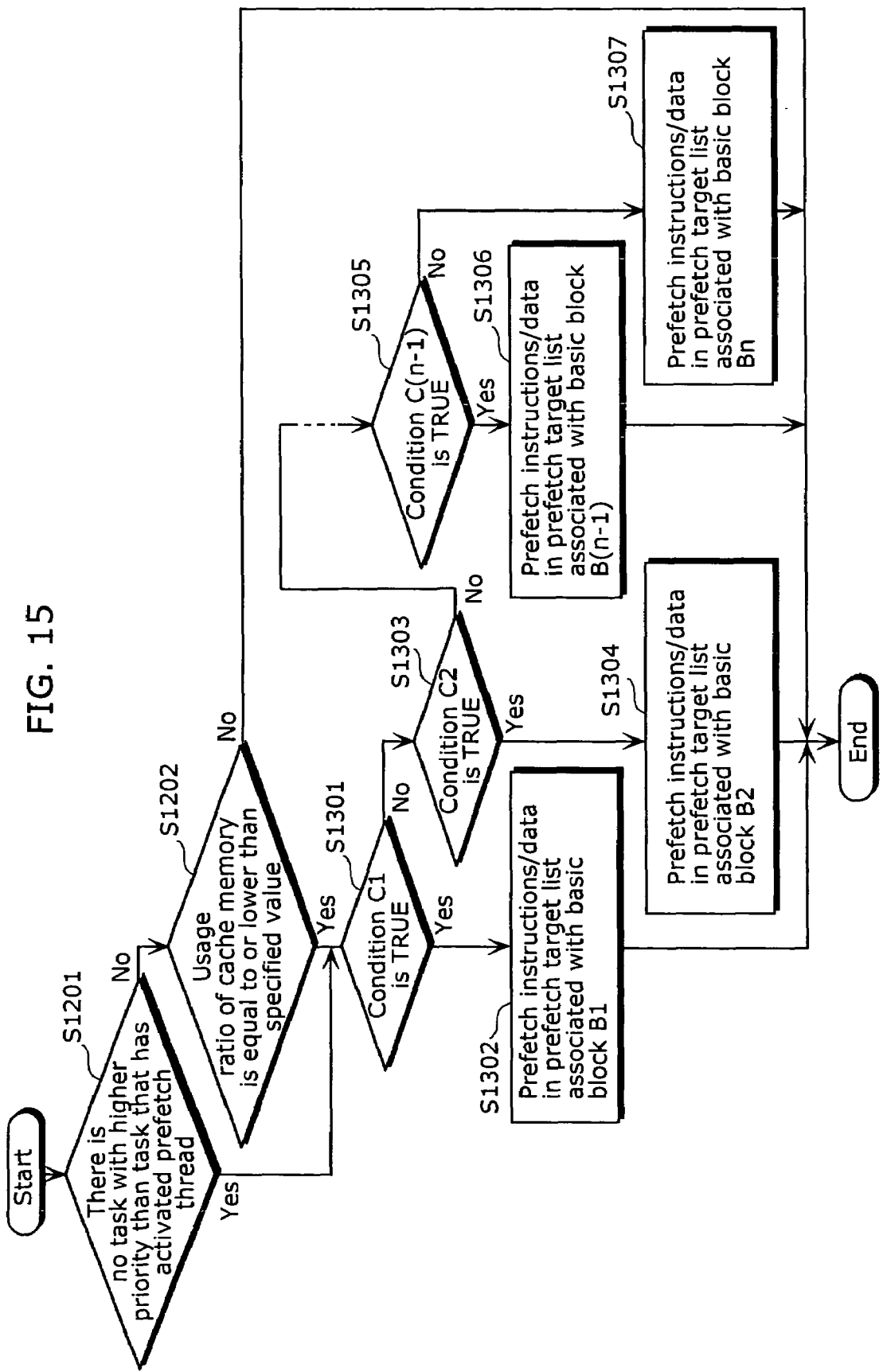

FIG. 15 is a flowchart showing processing performed in a prefetch thread generated by the thread process creation device 105 shown in FIG. 8. The prefetch thread shown in FIG. 15 is a prefetch thread that changes basic blocks to be prefetched depending on branch condition (thread that is activated in the processing for activating a prefetch thread shown in FIG. 13 (S1104)).

Here, suppose that there are "n" subsequent basic blocks from basic blocks B1 to Bn (where "n" is an integer), and that conditions for executing the basic blocks B1~Bn are conditions C1~Cn, respectively.

In this prefetch thread, as in the case of the prefetch thread shown in FIG. 14, the following processing is performed when there is no task with a higher priority than that of the task that has activated this prefetch thread (Yes in S1201), and when the usage ratio of the cache memory 602 is equal to or lower than the specified value although there is a task with a higher priority (No in S1201 and Yes in S1202).

The prefetch thread checks if any of the conditions C1~Cn is satisfied or not (S1301~S1305). Then, the prefetch thread chooses a prefetch target list of the basic block Bi that corresponds to a satisfied condition Ci, and prefetches instructions and data of addresses stored in such prefetch target list (S1302, S1304, S1306, and S1307).

For example, when the condition C1 is TRUE (Yes in S1301), the prefetch thread prefetches instructions and data of addresses registered in the prefetch target list that is associated with the basic block B1 (S1302). When the condition C2 is TRUE (Yes in S1303), the prefetch thread prefetches instructions and data of addresses registered in the prefetch target list that is associated with the basic block B2 (S1304).

When the condition C(n−1) is TRUE (Yes in S1305), the prefetch thread prefetches instructions and data of addresses registered in the prefetch target list that is associated with the basic block B(n−1) (S1306). When all of the conditions C1 to C(n−1) are FALSE, the prefetch thread prefetches instructions and data of addresses registered in the prefetch target list that is associated with the basic block Bn (51307) since the condition Cn is TRUE (No in S1305).

Figure 16:
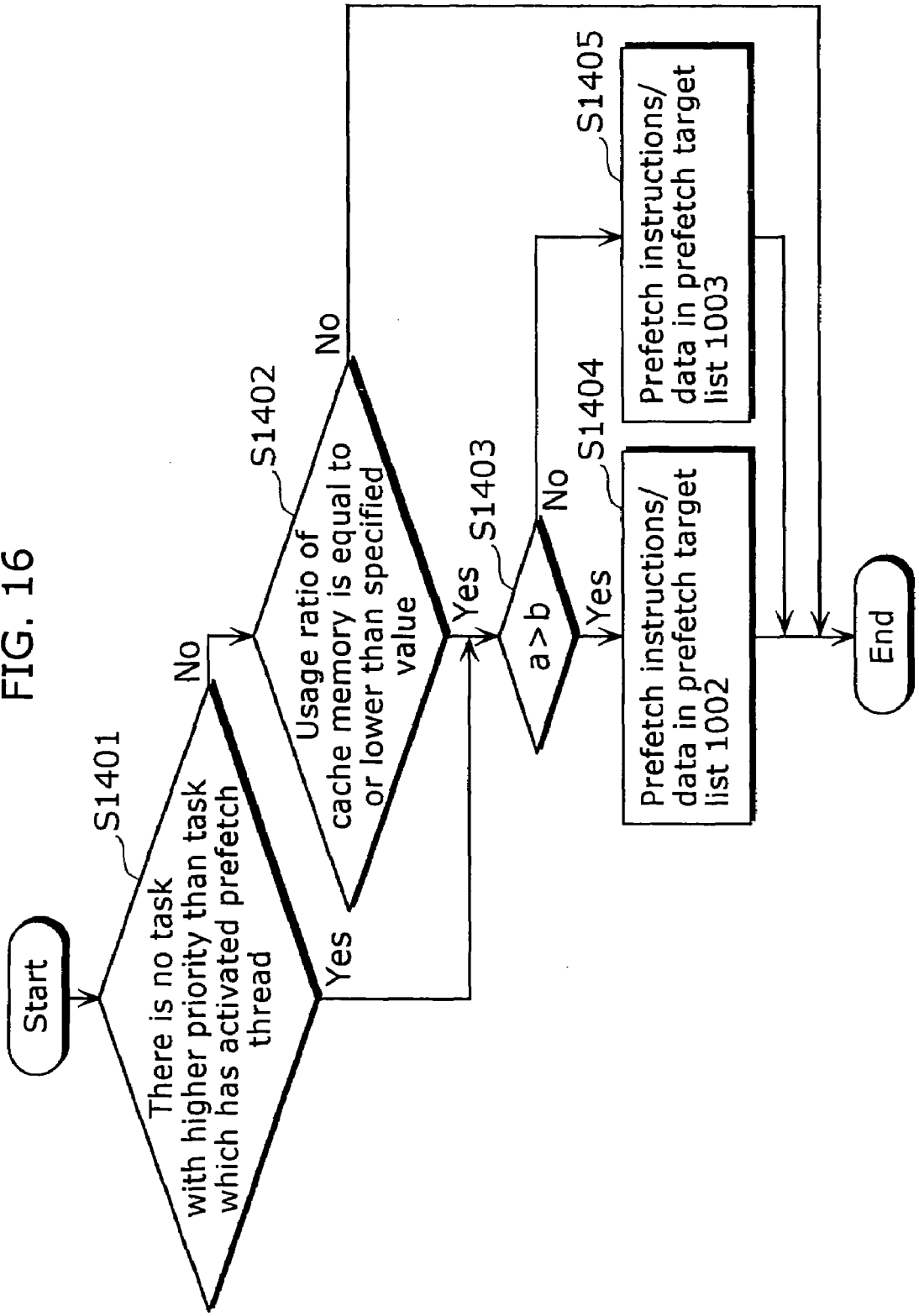
FIG. 16 is a flowchart showing processing performed in a prefetch thread that is activated by a process for activating a prefetch thread to be inserted in the basic block shown in FIG. 10.

Next, a description is given of a prefetch thread that is activated in a thread activation process. FIG. 16 is a flowchart showing processing performed in a prefetch thread that is activated by a process for activating a prefetch thread to be inserted in the basic block 801 shown in FIG. 10.

The prefetch thread checks whether a task with a higher priority than that of the task which has activated such prefetch thread is being executed or not (S1401). If a task with a higher priority is being executed (No in S1401), the prefetch thread checks the value held in the cache usage amount register 501 to see whether the value indicating the usage ratio of the cache memory 602 is equal to or lower than a specified value (S1402). If there is a task with a higher priority and the usage ratio of the cache memory 602 exceeds the specified value (No in S1401 and No in S1402), the prefetch thread terminates the processing without performing prefetch processing.

If there is no prefetch thread with a higher priority (Yes in S1401), or if the usage ratio of the cache memory 602 is equal to or lower than the specified value (Yes in S1402), the prefetch thread makes a judgment about a condition for branching to either the basic block 802 or the basic block 803 (S1403). Stated another way, the prefetch thread compares the sizes of the variable a and the variable b. When the value of the variable a is larger than the value of the variable b (Yes in S1403), the subsequent basic block is the basic block 802. Therefore, the prefetch thread prefetches instructions and data, based on addresses registered in the prefetch target list 1002 that corresponds to the basic block 802 (S1404).

When the value of the variable a is equal to or lower than the value of the variable b (No in S1403), the subsequent basic block is the basic block 803. Therefore, the prefetch thread prefetches instructions and data, based on addresses registered in the prefetch target list 1003 that corresponds to the basic block 803 (S1405).

Figure 17:
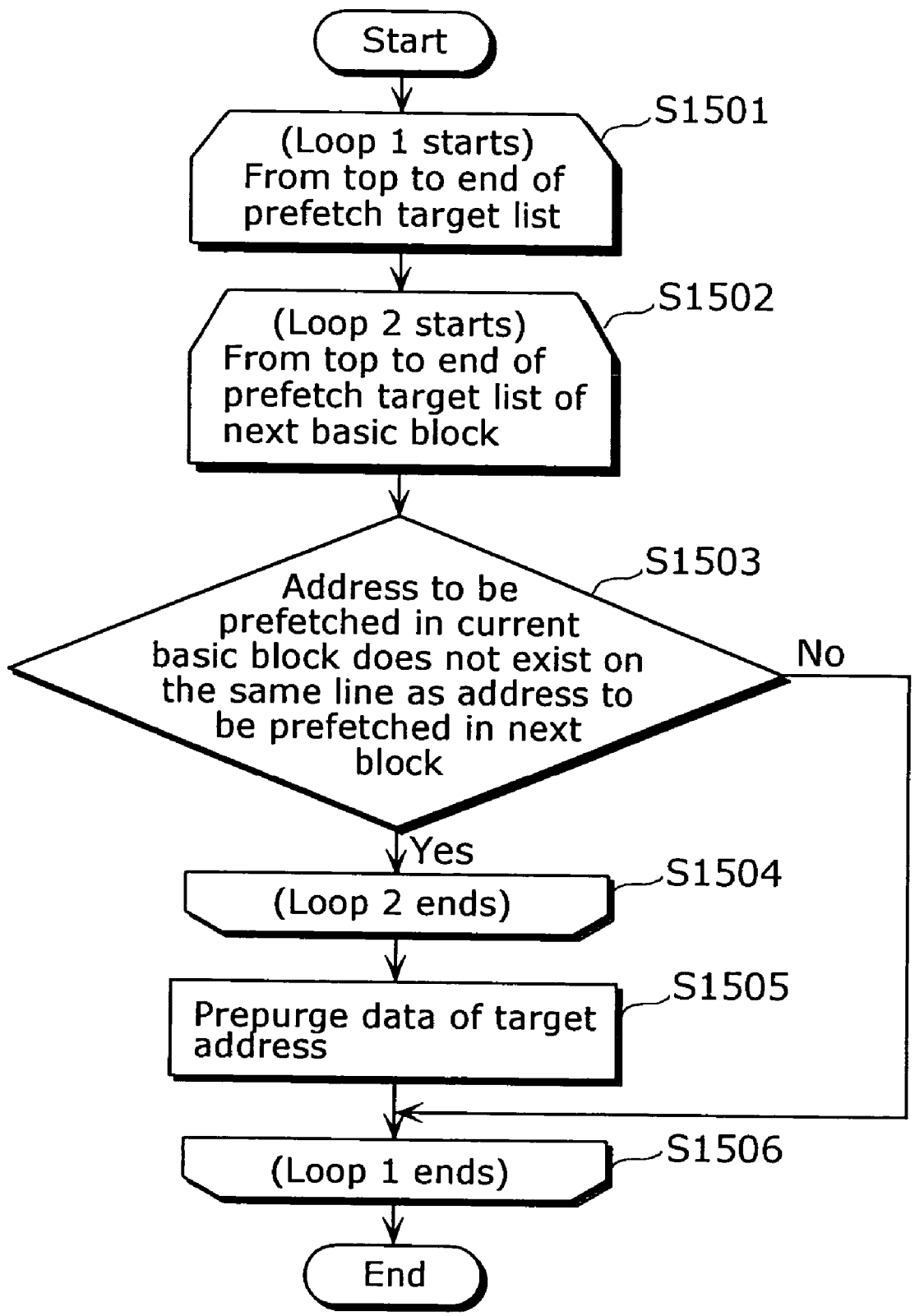
FIG. 17 is a flowchart showing processing performed in a prepurge thread.

The thread process creation device 105 creates prepurge threads in addition to the above-described prefetch threads. FIG. 17 is a flowchart showing processing performed in a prepurge thread. In the first loop processing (S1501~S1506), the prepurge thread sequentially chooses addresses included in the prefetch target list corresponding to a basic block to be prepurged. Furthermore, in the second loop processing (S1502~S1504), the prepurge thread sequentially chooses addresses included a basic block to be executed next after the basic block to be prepurged. In the first and second loops, the prepurge thread compares addresses included in the prefetch target list corresponding to the basic block to be prepurged and all addresses included in the prefetch target list corresponding to the next basic block. If the prefetch target list corresponding to the next basic block does not include any addresses that exist on the same line as an address included in the prefetch target list of the basic block to be prepurged (Yes in S1503), the prepurge thread prepurges, to the main memory 603, instructions and data of the address included in the prefetch target list corresponding to the basic block to be prepurged (S1505). If the prefetch target list corresponding to the next basic block includes an address that exists on the same line as an address included in the prefetch target list of the basic block to be prepurged (No in S1503), the prepurge thread chooses another address included in the prefetch target list corresponding to the basic block to be prepurged (S1506), and iterates the same processing (S1501~S1506).

For example, using the source code 700 shown in FIG. 9 and the basic blocks 801, 802, 803, and 805 shown in FIG. 10, suppose the case where a location used by the basic block 801 is prepurged. The basic block 802 or the basic block 803 is executed next, after the basic block 801 is executed. Thus, the prepurge thread compares the prefetch target list 1001 with the prefetch target lists 1002 and 1003.

First, the prepurge thread compares addresses stored in the prefetch target list 1001 corresponding to the basic block 801 with all addresses stored in the prefetch target lists 1002 and 1003. If the prefetch target lists 1002 and 1003 include an address that is on the same line as an address of the basic block 801 while they do not include any addresses which are the same as those of the basic block 801, the prepurge thread does not prepurge any addresses of the basic block 801. On the other hand, if the prefetch target list 1002 and 1003 do not include any addresses on the same line, the prepurge thread performs prepurge.

Since the addresses of the variables a and b exist in the prefetch target lists 1002 and 1003, the prepurge thread does not perform any prepurges. Meanwhile, when the address of the variable x does not exist in the prefetch target lists 1002 or 1003 but an address on the same line exists, the prepurge thread does not prepurge the address of the variable x. Similarly, the prepurge thread does not prepurge the address of the variable y if an address on the same line exists. The thread process creation device 105 creates a prepurge thread that performs the above processing, and a process for activating such prepurge thread is inserted.

(4) Image at Execution Time

Figure 18:
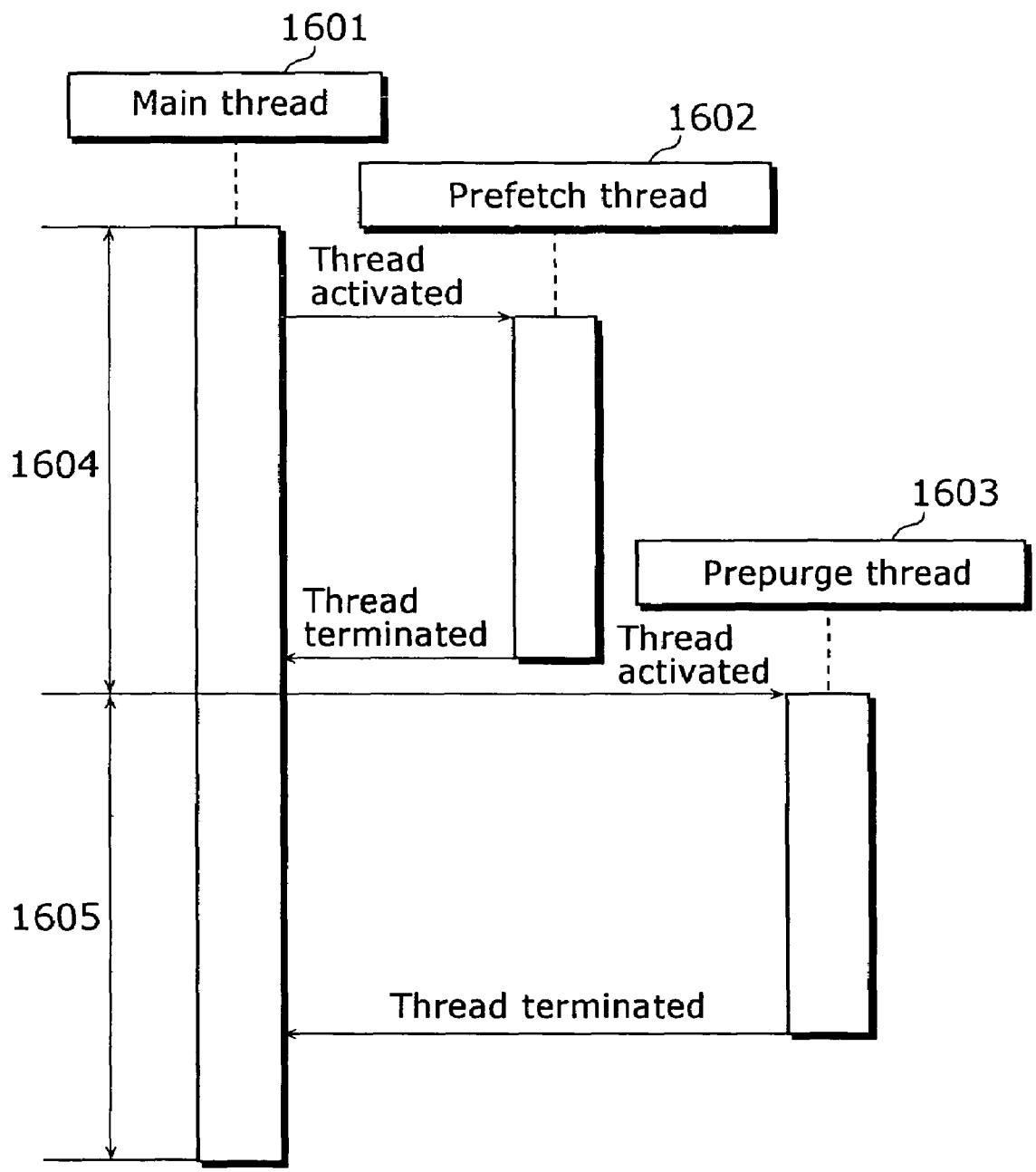
FIG. 18 is a diagram showing an operation image at the time of executing a program sequence created from the source code shown in FIG. 9.

FIG. 18 is a diagram showing an operation image at the time of executing a program sequence created from the source code 700 shown in FIG. 9. In FIG. 18, a main thread 1601 denotes a program written in source code. The basic block 801 is executed in an interval 1604, whereas either the basic block 802 or the basic block 803 is executed in an interval 1605.

Since thread activation processes are inserted in the program by the thread activation process insertion device 104 of the compiler apparatus 100, a prefetch thread 1602 is activated while the basic block 801 is being executed. The prefetch thread 1602 is a thread created by the thread process creation device 105 of the compiler apparatus 100. While operating in parallel with the main thread 1601, the prefetch thread 1602 prefetches instructions and data to be used by one of or both of the basic blocks 802 and 803 to be executed next, according to the flowchart shown in one of FIGS. 14, 15, and 16. The prefetch thread 1602 vanishes upon completion of prefetch processing.

The thread activation process insertion device 104 of the compiler apparatus 100 inserts a thread activation process when the processing of the basic block 801 finishes. For this reason, a prepurge thread 1603 is activated when the execution of the basic block 801 ends. The prepurge thread 1603 is a thread created by the thread process creation device 105 of the compiler apparatus 100. While operating in parallel with the main thread 1601, the prepurge thread 1603 prepurges instructions and data used by the basic block 801, according to the flowchart shown in FIG. 17. The prepurge thread 1603 vanishes upon completion of prepurge processing.

In an interval 1605, processing of either the basic block 802 or the basic block 803 is executed. Usually, instructions to be executed and variables to be used by the basic block 802 or 803 do not exist in the cache memory 602. This makes it impossible to execute a program while instructions and data are transferred from the main memory 603 to the cache memory 602. However, in a program complied by the compiler apparatus 100 according to the present invention, the prefetch thread 1602 transfers, in the interval 1605, instructions and data to be used in the interval 1605 to the cache memory 602. Accordingly, the CPU 601 can execute the processing of the next basic block 802 or 803 immediately after the execution of the processing of the basic block 801.

Furthermore, the prepurge thread 1603 purges, from the cache memory 602, instructions and data which are not to be used in the next basic block 802 or 803. Accordingly, it becomes possible to prevent necessary instructions and data from being flushed from the cache memory 602. Note that prefetch threads and prepurge threads are created and vanish repeatedly as in the above manner.

As described above, in the computer system according to the first embodiment of the present invention, a prefetch thread monitors the usage ratio of the cache memory, and performs no prefetch if the usage ratio is high. Accordingly, by performing a prefetch, it becomes possible to prevent currently used instructions and data from being purged into the main memory. This makes it possible to reduce cache miss occurrence and therefore to improve the speed of executing programs. Moreover, by prefetching instructions or data to be used by a program with a lower priority, there does not occur a case where instructions or data used by a program with a higher priority is discarded and a prefetch is performed in vain.

Furthermore, in the present embodiment, when there are two or more subsequent basic blocks, in the case where a prefetch completes before the subsequent basic block is to be executed even after a branch condition is determined, the prefetch is designed to be performed after such branch condition is determined. Accordingly, it becomes impossible for instructions and data of unnecessary basic blocks to be prefetched.

Moreover, it is also possible to allow a prefetch to be performed when a task that has activated a prefetch thread is the task with the highest priority. Accordingly, it is impossible that instructions or data used by a task with a higher priority are flushed from the cache memory by a task with a lower priority, and therefore to increase the hit rate of the cache memory.

Second Embodiment

Next, detailed descriptions are given of a computer system according to the second embodiment of the present invention with reference to the drawings. Unlike the computer system in the first embodiment, the computer system according to the present embodiment is equipped with more than one CPU and therefore is capable of parallel execution of processes.

Figure 19:
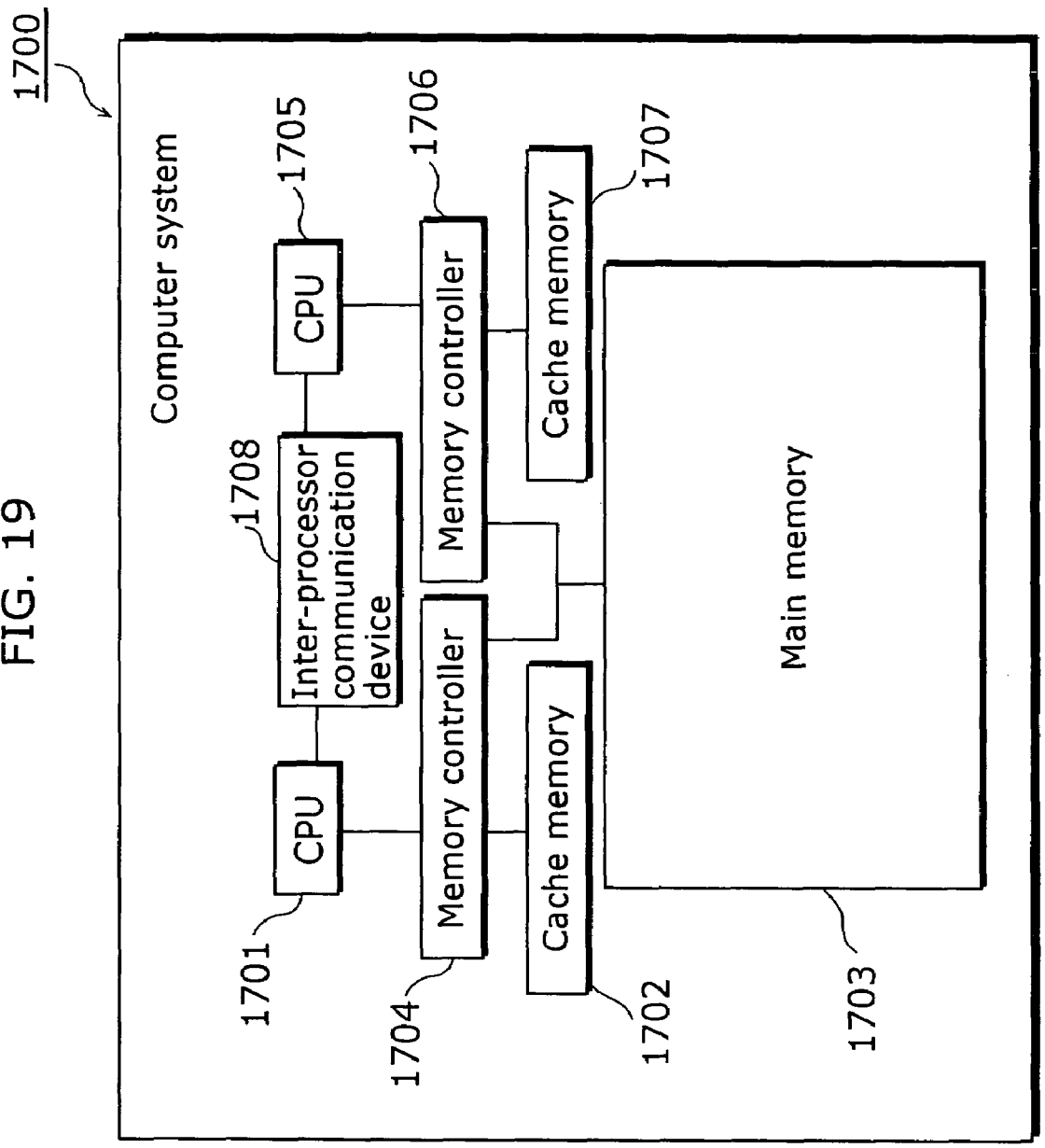
FIG. 19 is a diagram showing a configuration of a computer system that is equipped with plural processors according to a second embodiment of the present invention.

FIG. 19 is a diagram showing a configuration of a computer system that is equipped with plural processors. A computer system 1700 is formed of two CPUs 1701 and 1705, a main memory 1703, two cache memories 1702 and 1707, two memory controllers 1704 and 1706, and an inter-processor communication device 1708.

The main memory 1703 has the same configuration as that of the main memory 603 according to the first embodiment.

Each of the cache memories 1702 and 1707 has the same configuration as that of the cache memory 602.

The CPU 1701 is an arithmetic unit that executes instructions stored in either the main memory 1703 or the cache memory 1702, and that performs data reading and writing between the main memory 1703 or the cache memory 1702. The CPU 1705 is an arithmetic unit that executes instructions stored in either the main memory 1703 or the cache memory 1707, and that performs data reading and writing between the main memory 1703 or the cache memory 1707.

The memory controller 1704 is a control device that controls access between the main memory 1703 and the cache memory 1702 and that controls access between the CPU 1701 and the cache memory 1702 as well as the main memory 1703. The memory controller 1706 is a control device that controls access between the main memory 1703 and the cache memory 1707 and that controls access between the CPU 1705 and the cache memory 1707 as well as the main memory 1703.

The inter-processor communication device 1708 is a device that connects the CPU 1701 and the CPU 1705 to enable communications to be carried out between the CPUs. Accordingly, it becomes possible for programs running on the respective CPUs to send a command to the other CPU via the inter-processor communication device 1708. More specifically, the CPUs 1701 and 1705 are assigned unique processor IDs so that they can send a command to an arbitrary CPU by specifying its processor ID.

Figures 20A, 20B:
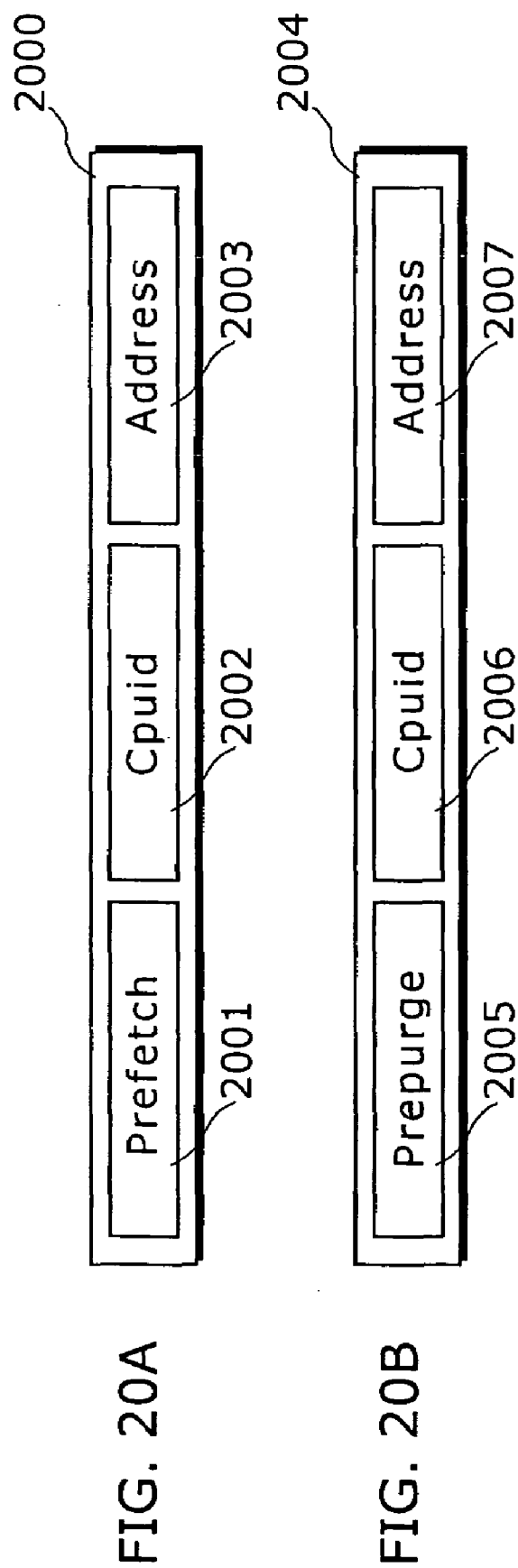
FIG. 20A is a diagram for explaining a prefetch instruction intended for another processor.
FIG. 20B is a diagram for explaining a prepurge instruction intended for another processor.

FIG. 20A is a diagram for explaining an instruction for causing the cache memory of the other CPU to perform a prefetch. FIG. 20B is a diagram for explaining an instruction for causing the cache memory of the other CPU to perform a prepurge. As FIG. 20A shows, a prefetch instruction 2000 is an instruction represented by an operation code 2001 "Prefetch", as in the case of the prefetch instruction that is used in the computer system equipped with a single CPU shown in FIG. 6A. However, unlike the instruction shown in FIG. 6A, it also includes an operand 2002 "Cpuid" indicating to which CPU the prefetch instruction is directed, in addition to an operand 2003 "Address". This instruction causes a CPU with the processor ID indicated by the operand 2002 "Cpuid" to prefetch instructions or data stored in a location specified by the address indicated by the operand 2003 "Address".

Similarly, a prepurge instruction 2004 shown in FIG. 20B causes a CPU with the processor ID indicated by an operand 2006 "Cpuid" to prepurge data stored in a location specified by the address indicated by an operand 2007 "Address".

FIG. 21A is a diagram showing an example of the prefetch instruction 2000 shown in FIG. 20A. FIG. 21B is a diagram showing an example of the prepurge instruction 2004 shown in FIG. 20B. Here, suppose that the processor ID of the CPU 1701 is "0" and the processor ID of the CPU 1705 is "1".

Here, assume that a prefetch thread is running on the CPU 1701 and that a program corresponding to a basic block that has called such prefetch thread is running on the CPU 1705. In this case, the prefetch thread running on the CPU 1701 causes the CPU 1705 to perform a prefetch. Consider an example case where the prefetch thread running on the CPU 1701 causes the CPU 1705 to prefetch data stored in the main memory 1703 at the address 0x80000008. In this case, the prefetch thread executes a prefetch instruction 2100 shown in FIG. 21A. When the prefetch instruction 2100 is executed, the CPU 1701 issues a command to the inter-processor communication device 1708 to cause the CPU 1705 to prefetch instructions or data stored in the main memory 1703 at the address 0x80000008. Upon receipt of such command, the inter-processor communication device 1708 issues a command to the CPU 1705 to prefetch instructions or data stored in the main memory 1703 at the address 0x80000008. Subsequently, instructions or data stored in the main memory 1703 are transferred to the cache memory 1707, according to the same procedure of the first embodiment.

Next, assume that a prepurge thread is running on the CPU 1701 and that a program corresponding to a basic block that has called such prepurge thread is running on the CPU 1705. In this case, the prepurge thread running on the CPU 1701 causes the CPU 1705 to perform a prepurge. For example, the prepurge thread running on the CPU 1701 executes the prepurge thread 2101 shown in FIG. 21B, when prepurging data corresponding to the address 0x80000008 on the cache memory 1707 of the CPU 1705. In this case, a prepurge command is issued to the CPU 1705 according to the same procedure as that for prefetch.

Figure 22:
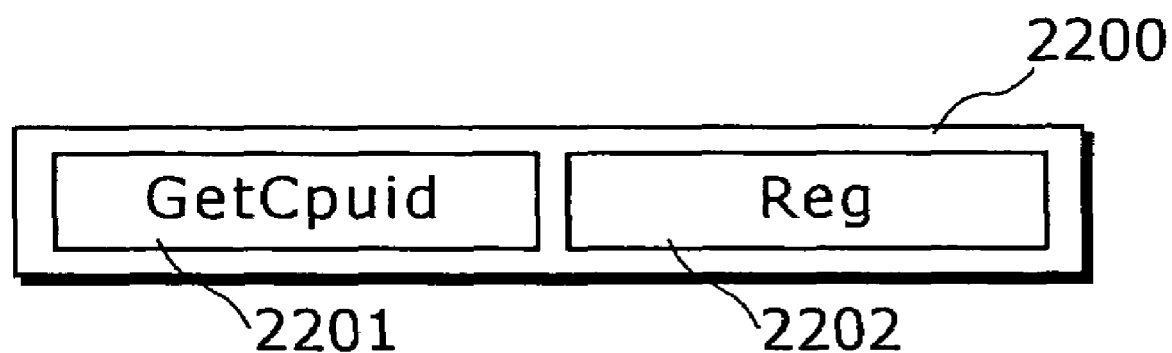
FIG. 22 is a diagram for explaining a processor identification instruction.

FIG. 22 is a diagram for explaining a processor identification instruction that is executed for a program to identify the processor ID of a CPU on which it is being executed. A processor identification instruction 2200 is an instruction that is represented by an operation code 2201 "GetCpuid". When this instruction is executed, the processor ID of a CPU on which the program is being executed is stored into a register 2202 "Reg" represented by an operand.

As described above, by including a processor identification instruction as part of the configuration, it becomes possible to previously inform a prefetch thread of the processor ID of a CPU on which the main thread is being executed, when such prefetch thread is activated. This makes it possible for a CPU on which a prefetch thread is running to make a prefetch request to another CPU on which the main thread is running, even when the prefetch thread and the main thread are running on different CPUs. Note that the processor identification instruction 2200 is executed when the execution of the main thread starts, and a processor ID is passed in the form of an argument when the prefetch thread is activated. Here, it is also possible that a processor ID is written in the main memory 1703, which is then passed to the prefetch thread via the main memory 1703. For a prepurge thread too, the processor ID of a CPU on which the main thread is running is passed, as in the case of the prefetch thread.

Detailed descriptions of the other processing are not given here since they are the same as those given in the first embodiment.

Note that in the operating system according to the present embodiment, a task is assigned preferentially to the CPU 1701 (1705) having the cache memory 1702 (1707) whose usage ratio is the lowest. However, as in the case of the computer system 600 that is equipped with a single processor, when the usage ratios of all the cache memories 1702 and 1707 exceed a specified value, the frequency at which a task with a lower priority is executed is reduced, and the frequency at which a task with a higher priority is executed is increased instead.

According to the present embodiment, in addition to the functions and effects provided by the computer system of the first embodiment, the inter-processor communication device controls access between one processor and another processor. This facilitates the control of more than one cache memory on a program.

Furthermore, by preferentially assigning a task to a processor whose usage ratio is lower, it is possible to improve the overall performance of a computer.

Moreover, the frequency of a task with a higher priority is increased if the usage ratios of all cache memories exceed a specified value. Accordingly, it becomes possible to control plural cache memories on a task-by-task basis in consideration of task priorities.

Note that the compiler apparatus presented in the present embodiment is embodied as a program to be executed on a computer. Therefore, it is possible to store such program on recording media including floppy disk, hard disk, CD-ROM, Magneto-Optical disc (MO), Digital Versatile Disc-Read Only Memory (DVD-ROM). Also, it is possible to store codes in executable form created by the compiler apparatus on these recording media.

Although only some exemplary embodiments of the hardware, operating system, and compiler according to this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

For example, the computer systems according to the aforementioned embodiments are formed of one or two CPUs, but they may be equipped with three or more CPUs.

Furthermore, in the above embodiments, it is assumed that prepurge processing and prefetch processing are executed for all basic blocks, but such processing does not necessarily have to be performed for all basic blocks, and therefore prefetch processing and prepurge processing may be executed for specific basic blocks. For example, the compiler apparatus may select a basic block for which prefetch and prepurge processing should be performed, based on a loop condition and the like included in a program, execute prefetch processing and prepurge processing only for a basic block for which such processing is effective, based on profile information, and select a basic block for which prefetch processing or prepurge processing should be performed by specifying a compilation option or a program.

Moreover, the compiler apparatus according to the above embodiments creates a prefetch thread and a prepurge thread on a basic block basis, but these threads do not have to be provided for each basic block. For example, a prefetch thread and a prepurge thread may be provided for each function or an arbitrary unit of processing so as to execute prefetch processing and prepurge processing. In this case, it is preferable that units of creating prefetch target lists are changed by the prefetch target extraction device 103, and locations of inserting thread activation processes are changed by the thread activation process insertion apparatus 104.

Furthermore, access to the cache memories of the aforementioned embodiments is controlled according to a fully associative scheme, but the significance of the present invention is maintained if access control is performed according to a set associative scheme and a direct-mapped scheme.

Moreover, the prepurge thread shown in FIG. 17 prepurges variables that are not used in the immediately next basic block, but it may also prepurge variables that are not used for two or more subsequent basic blocks. By performing prepurge in consideration of subsequent basic blocks, it is possible to prevent prepurged variables from being prefetched soon after that.

INDUSTRIAL APPLICABILITY

The present invention is applicable to a computer system equipped with a cache memory, as well as to a compiler apparatus and an operating system, and the like used in such computer system.

What is claimed is:

1. A computer-readable storage medium having a compiler program stored thereon, the compiler program for converting a source program, having predetermined execution groups and written in a high-level language, into an executable program, the compiler program causing a computer to execute a method comprising:

extracting an address of an instruction or data to be prefetched from a main memory to a cache memory, for each of the predetermined execution groups in the source program, and generating an address list that lists the address of each instruction or data to be prefetched;

creating a prefetch thread by (i) analyzing a control structure of each of the predetermined execution groups in the source program, (ii) selecting, from the address list, the address of the instruction or data to be prefetched according to a result of said analyzing of the control structure, and (iii) creating the prefetch thread for executing a prefetch by extracting the instruction or data to be prefetched that is stored in a location of the main memory specified by the selected address;

determining a prefetch start time, which is a time at which the prefetch is to be executed, based on a total time calculated by combining (i) an execution time required for the instruction of a current predetermined execution group to execute and (ii) a time related to the execution of the prefetch of the instruction or data from a next predetermined execution group, the prefetch start time being determined to allow sufficient time for the execution of the prefetch to complete before the execution of the instruction of the next predetermined execution group begins;

inserting into the source program, at the prefetch start time determined by said determining of the prefetch start time, a process for activating the prefetch thread for executing the prefetch by prefetching the instruction or data of the next predetermined execution group; and converting the prefetch thread and the source program into the executable program.

2. The computer-readable storage medium according to claim 1, wherein said creating of the prefetch thread includes (i) checking a priority of a task that activates said creating of the prefetch thread, and (ii) creating the prefetch thread for executing the prefetch when a task with a priority higher than the priority of the task that activates said creating of the prefetch thread is not executed.

3. The computer-readable storage medium according to claim 2, wherein said creating of the prefetch thread includes creating the prefetch thread for executing the prefetch only when a usage ratio of the cache memory is equal to or lower than a specified value.

4. The computer-readable storage medium according to claim 1, wherein:

when there are a plurality of predetermined execution groups with a possibility to be executed immediately after the current predetermined execution group, said determining of the prefetch start time includes (i) checking whether or not any instruction or data of one of the plurality of predetermined execution groups is prefetched at a time at which the one of the plurality of predetermined execution groups is determined to be the next predetermined execution group to be executed immediately after the current execution group and checking whether or not the execution of the prefetch completes before processing of the next predetermined execution group starts, and (ii) regarding the time at which the next predetermined execution group is determined as a time of starting the execution of the prefetch of the instruction or data of the next predetermined execution group, when a result of said checking of whether or not the execution of the prefetch completes indicates that the execution of the prefetch has been completed before the processing of the next predetermined execution group starts; and when there are a plurality of predetermined execution groups with a possibility to be executed immediately after the current predetermined execution group, and when the result of said checking of whether or not the execution of the prefetch completes indicates that the execution of the prefetch has been completed before the processing of the next predetermined execution group starts even if the execution of the prefetch is performed at the time at which the next predetermined execution group is determined, said creating of the prefetch thread includes selecting processing for determining the next predetermined execution group, selecting the next predetermined execution group according to a result of a determination based on the processing for determining, and creating a prefetch thread for prefetching the instruction or data of the selected predetermined execution group.

5. The computer-readable storage medium according to claim 1, wherein each of the predetermined execution groups is a basic block.

6. A compilation method for converting a source program, having predetermined execution groups and written in a high-level language, into an executable program, said compilation method comprising:

extracting an address of an instruction or data to be prefetched from a main memory to a cache memory, for each of the predetermined execution groups in the source program, and generating an address list that lists the address of each instruction or data to be prefetched;

creating a prefetch thread by (i) analyzing a control structure of each of the predetermined execution groups in the source program, (ii) selecting, from the address list, the address of the instruction or data to be prefetched according to a result of said analyzing of the control structure, and (iii) creating the prefetch thread for executing a prefetch by extracting the instruction or data to be prefetched that is stored in a location of the main memory specified by the selected address;

determining a prefetch start time, which is a time at which the prefetch is to be executed, based on a total time calculated by combining (i) an execution time required for the instruction of a current predetermined execution group to execute and (ii) a time related to the execution of the prefetch of the instruction or data from a next predetermined execution group, the prefetch start time being determined to allow sufficient time for the execution of the prefetch to complete before the execution of the instruction of the next predetermined execution group begins;

inserting into the source program, at the prefetch start time determined by said determining of the prefetch start time, a process for activating the prefetch thread for executing the prefetch by prefetching the instruction or data of the next predetermined execution group; and converting the prefetch thread and the source program into the executable program.

7. The computer-readable storage medium according to claim 1, wherein:

the time related to the execution of the prefetch of the instruction or data from the next predetermined execution group is a time required to prefetch the instruction or data from the next predetermined execution group; and the prefetch start time is determined to allow the execution of the instruction of the next predetermined instruction group to begin immediately after the execution of the instruction of the current predetermined execution group.

8. The compilation method according to claim 6, wherein:

the time related to the execution of the prefetch of the instruction or data from the next predetermined execution group is a time required to prefetch the instruction or data from the next predetermined execution group; and the prefetch start time is determined to allow the execution of the instruction of the next predetermined instruction group to begin immediately after the execution of the instruction of the current predetermined execution group.

* * * * *